US011210075B2

(12) United States Patent
Bond et al.

(10) Patent No.: US 11,210,075 B2
(45) Date of Patent: Dec. 28, 2021

(54) SOFTWARE AUTOMATION DEPLOYMENT AND PERFORMANCE TRACKING

(71) Applicant: CenturyLink Intellectual Property LLC, Broomfield, CO (US)

(72) Inventors: Brian E. Bond, Fairmont, WV (US); David J. Moore, Lakewood Ranch, FL (US); William J. Keaton, Yardley, PA (US); Dusti M. Bastian, Laramie, WY (US); Troy A. Ferrence, Lino Lakes, MN (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 16/925,140

(22) Filed: Jul. 9, 2020

(65) Prior Publication Data

US 2021/0011698 A1 Jan. 14, 2021

Related U.S. Application Data

(60) Provisional application No. 62/873,605, filed on Jul. 12, 2019.

(51) Int. Cl.
*G06F 9/44* (2018.01)
*G06F 8/60* (2018.01)
(Continued)

(52) U.S. Cl.
CPC ............ *G06F 8/60* (2013.01); *G06F 11/3409* (2013.01); *G06Q 10/06313* (2013.01); *G06Q 30/0283* (2013.01)

(58) Field of Classification Search
CPC . G06F 8/60; G06F 11/3409; G06Q 10/06313; G06Q 30/0283
(Continued)

(56) References Cited

U.S. PATENT DOCUMENTS

| 8,006,223 | B2 * | 8/2011 | Boulineau | ........ | G06Q 10/06313 |
| | | | | | 717/101 |
| 8,527,327 | B1 * | 9/2013 | Lawrence | ............ | G06Q 10/103 |
| | | | | | 705/7.38 |

(Continued)

OTHER PUBLICATIONS

Existek, "How to Calculate Man-Hours for The Software Project: Explanation with an Example", 2018, downloaded from Existek Blog, https://existek.com/, 7 pages. (Year: 2018).*

(Continued)

*Primary Examiner* — Ted T. Vo

(57) ABSTRACT

Through the systems and methods described herein for provisioning a software automation and tracking performance of the software automation throughout its lifecycle. A realized benefit of deployment of the software automation can be determined and automatically reported according to a schedule. The reports may be provided to certain specified recipients such as project managers, executive officers, sales and/or vendor relations managers, and the like for analysis and processing by the various parties associated with the operation of the software automation. This all-in-one system provides a platform from which one or more software automation projects may be automatically managed through completion and deployment, improving efficiency of the project and management of all deployed software automations for a more cost-effective suite of such programs.

18 Claims, 32 Drawing Sheets

(51) Int. Cl.
*G06F 11/34* (2006.01)
*G06Q 10/06* (2012.01)
*G06Q 30/02* (2012.01)

(58) Field of Classification Search
USPC .................................................. 717/101–103
See application file for complete search history.

(56) References Cited

U.S. PATENT DOCUMENTS

| 8,543,438 B1* | 9/2013 | Fleiss ................. | G06Q 10/0631 |
| | | | 705/7.13 |
| 9,922,345 B2* | 3/2018 | Mikurak ............ | G06Q 30/0261 |
| 2005/0114829 A1* | 5/2005 | Robin .................... | G06Q 10/06 |
| | | | 717/101 |
| 2017/0212829 A1* | 7/2017 | Bales ................. | G06F 11/3612 |

OTHER PUBLICATIONS

Existek, "Web Application Development Cost Estimation", 2018, downloaded from Existek Blog, https://existek.com/, 8 pages . (Year: 2018).*

IBM, "IBM Robotic Process Automation with Automation Anywhere V11—Solution Overview", 2018, IBM Corporation, 11 pages. (Year: 2018).*

* cited by examiner

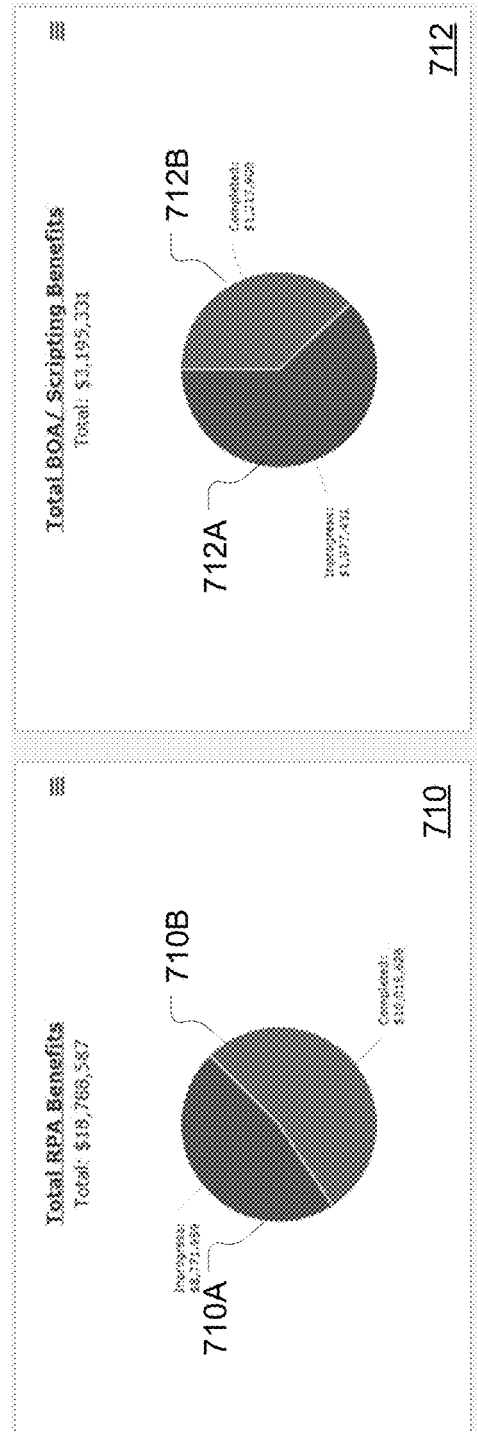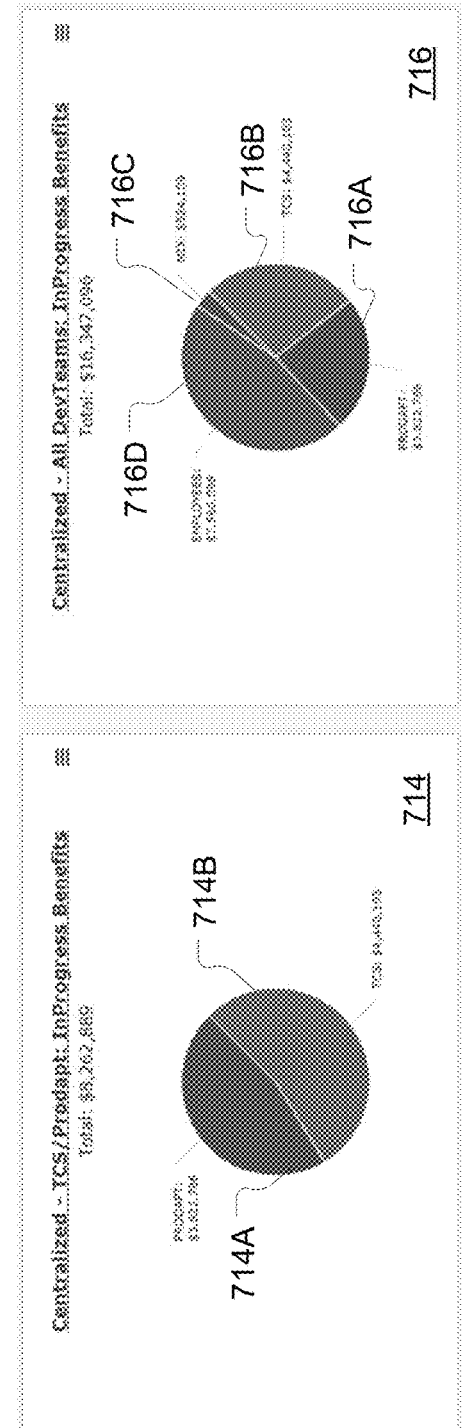
FIG. 7B
FIG. 7C

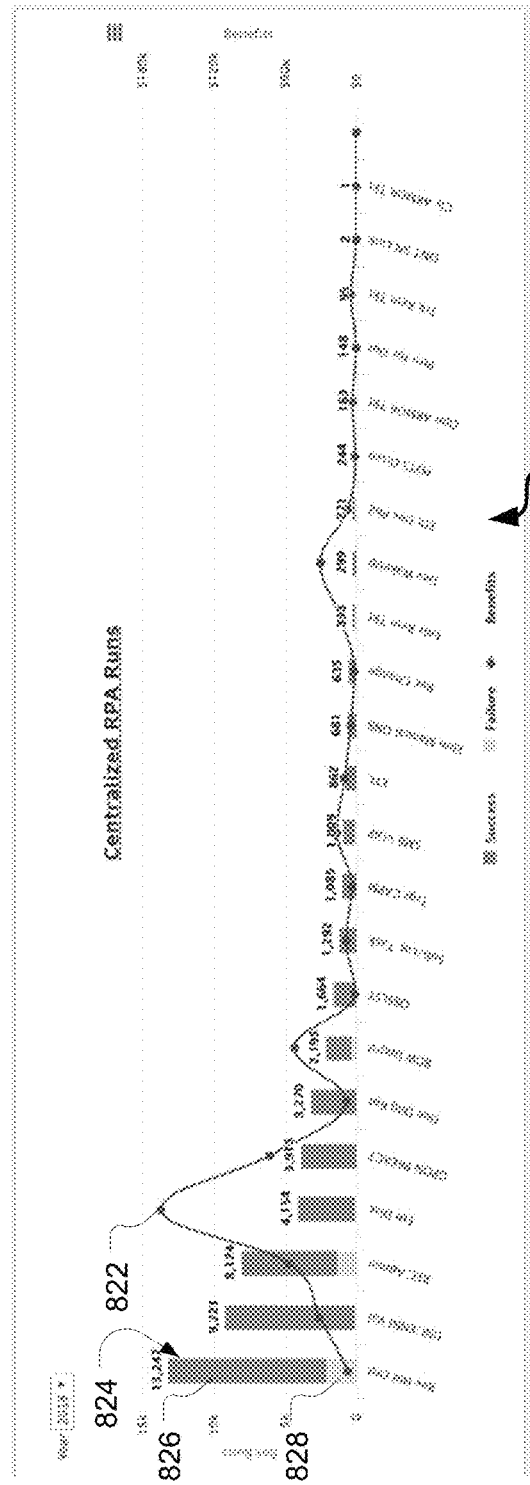
FIG. 8B
FIG. 8C
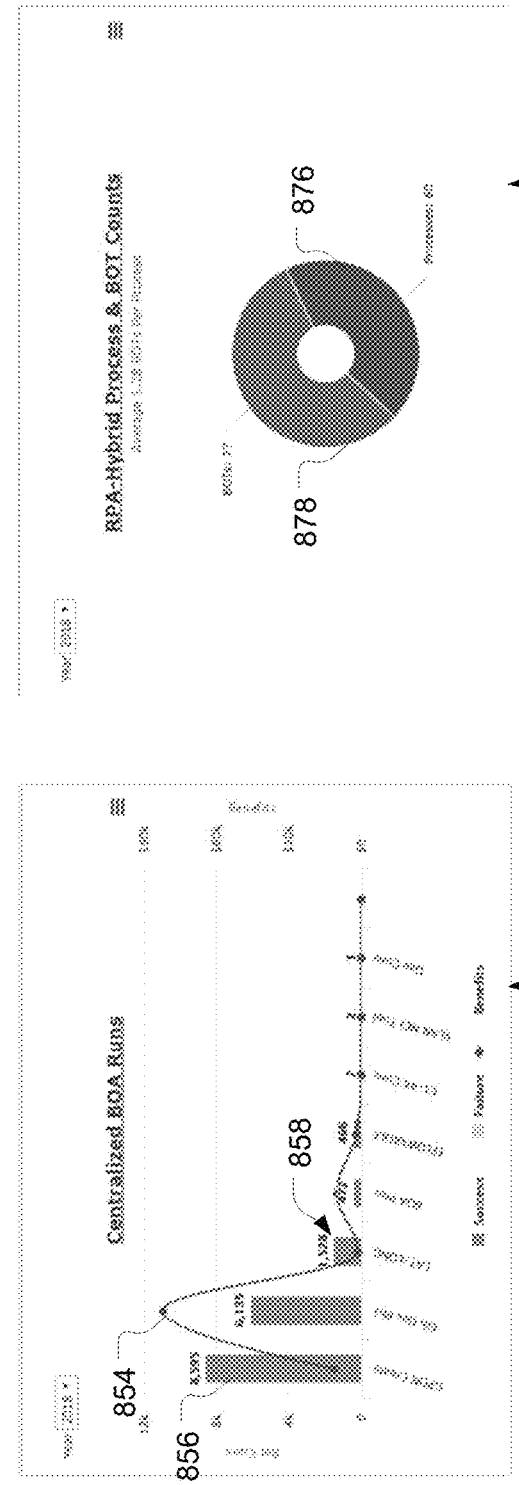
FIG. 8D

Users Data summary

| Name | Business Unit | Role | Email ID | |
|---|---|---|---|---|
| A. Smith | Service Delivery | Support Administrator | support@companya.com | ☑ ⊗ |
| B. Smith | Service Delivery | COE Director Administrator | bsmith@companyb.com | ☑ ⊗ |
| C. Smith | Operations Planning and Strategy | COE Admin | csmith@companyb.com | ☑ ⊗ |
| D. Smith | Service Delivery | COE Admin | dsmith@companya.com | ☑ ⊗ |
| Techserv | Service Delivery | Sites Premium SEs | techserv@companyb.com | ☑ ⊗ |
| E. Smith | Operations Planning and Strategy | COE Director Administrator | esmith@companya.com | ☑ ⊗ |
| Business Clients | Service Delivery | Business User | client@companya.com | ☑ ⊗ |
| F. Smith | Service Delivery | Business User | fsmith@companyb.com | ☑ ⊗ |
| G. Smith | Service Delivery | Business User | gsmith@companyb.com | ☑ ⊗ |
| H. Smith | Service Delivery | Business User | hsmith@companyb.com | ☑ ⊗ |
| Regular User | Service Delivery | Business User | regular.user@companyb.com | ☑ ⊗ |
| I. Smith | Operations Planning and Strategy | COE Admin | ismith@companyb.com | ☑ ⊗ |

FIG. 13A

Add User Account

Approver * — 1352
SME * — 1354

Name * — 1356
Business Unit — 1366
None

Email Address — 1358
Functional Area — 1368
Provisioning

CUID — 1360
Job Title — 1370

Mobile # — 1362
Role — 1372
Business User

Personnel Number — 1374

☑ Send New User Email — 1364

✓ Save
✗ Cancel

SOFTWARE AUTOMATION DEPLOYMENT AND PERFORMANCE TRACKING

CROSS-REFERENCE TO RELATED APPLICATIONS

This application is related to and claims priority under 35 U.S.C. § 119(e) from U.S. Patent Application No. 62/873,605 filed Jul. 12, 2019 entitled "Software Automation Deployment and Performance Tracking," the entire contents of which is incorporated herein by reference for all purposes.

TECHNICAL FIELD

Embodiments of the present invention generally relate to systems and methods for provisioning software automations. In particular, embodiments of the present invention relate to systems and methods for tracking performance of provisioned automation software and determining realized benefits attributable to the provisioned automation software.

BACKGROUND

Software automation or robotic process automation (RPA) is a form of process automation technology in which a software program, or "bot", is configured to perform a series of tasks typically performed by a human user or worker. For example, a workflow may include accessing a first system using a first username and password, manipulating the first system through a series of first inputs via one or more input devices, notifying a user that a first step is complete, accessing a second system using a second username and password, providing a series of second inputs to interact with the second system, and so on until the workflow is completed. Generally, such steps are performed by one or more human parties to the workflow.

In some instances, however, a bot may be programmed or created to perform the tasks of the workflow to reduce the man-hours, costs, and time consumed to perform the workflow. For the above example, the bot may interact via a virtual workstation or virtual machine to communicate with the first system, provide the inputs to interact with the first system (such as transmitting the first username and password, providing keyboard and/or mouse inputs via the virtual workstation, and the like), communicate with the second system, and so on to complete the workflow. Typically, the bot takes less time to complete the workflow than a human user, improving the overall efficiency of the workflow.

Although a bot may provide many benefits, creation of bots to perform such tasks is not a trivial exercise. Developing, creating, deploying, and tracking of software automation programs is a time consuming and costly endeavor that may include approval and man-hours from several parties, including developers, managers, sales people, and the like of a business considering requesting a bot to perform workflows. Further, the cost savings obtained from a bot performing a particular workflow may be unknown prior to funding the bot creation. Finally, the performance and actual cost savings obtained through an operating bot over a period of time is not often correlated such that strategic planning of bot use is a difficult task.

It is with these observations in mind, among other, that aspects of the present disclosure were conceived.

SUMMARY

One aspect of the present disclosure relates to a system for managing a software automation comprising one or more processors and a memory storing instructions that, when executed by the one or more processors, cause the one or more processors to perform operations. Such operations may include receiving, via a portal displayed on a display device, software automation project information comprising a description of a software automation project and deliverable conditions for completing the software automation project and calculating, based on the software automation information, a man-hour cost benefit associated with deployment of the software automation project. The operation may also include generating, based on the man-hour cost benefit exceeding a benefit threshold value, a work order for deploying the software automation, the software automation to perform an automated task on a computing device and storing, on an application server, the software automation for execution by the application server.

Another aspect of the present disclosure relates to a method for managing a software automation project comprising receiving, via a portal executed by a computing device, software automation project information comprising a description of a software automation project and deliverable conditions for completing the software automation project and calculating, by the computing device and based on the software automation information, a man-hour cost benefit associated with deployment of the software automation project. The method may also include the operations of generating, based on the man-hour cost benefit exceeding a benefit threshold value, a work order for deploying the software automation, the software automation to perform an automated task on a computing device and storing, on an application server, the software automation for execution by the application server. Yet another aspect of the present disclosure relates to code implemented in a non-transitory, computer readable medium that when executed by at least one processor, is operable to perform at least the above-described operations.

BRIEF DESCRIPTION OF THE DRAWINGS

FIGS. 4A-4F are example interfaces initiating a software automation project, in accordance with the subject technology;

FIGS. 7A-7C are example interfaces for reviewing aggregated financial health information for software automation project pipelines, in accordance with the subject technology;

FIGS. 8A-8F are example interfaces for reviewing deployed software automation health information for software automation project pipelines, in accordance with the subject technology;

FIGS. 10A-10D are example interfaces for managing software automation components, in accordance with the subject technology;

FIGS. 11A-11E are example interfaces for managing an organization related to provisioning software automations, in accordance with the subject technology;

FIGS. 12A-12E are example interfaces for managing support for a software automation projects pipeline, in accordance with the subject technology;

FIGS. 13A and 13B are example interfaces for managing users for a software automation projects pipeline, in accordance with the subject technology.

DETAILED DESCRIPTION

Figure 1A:
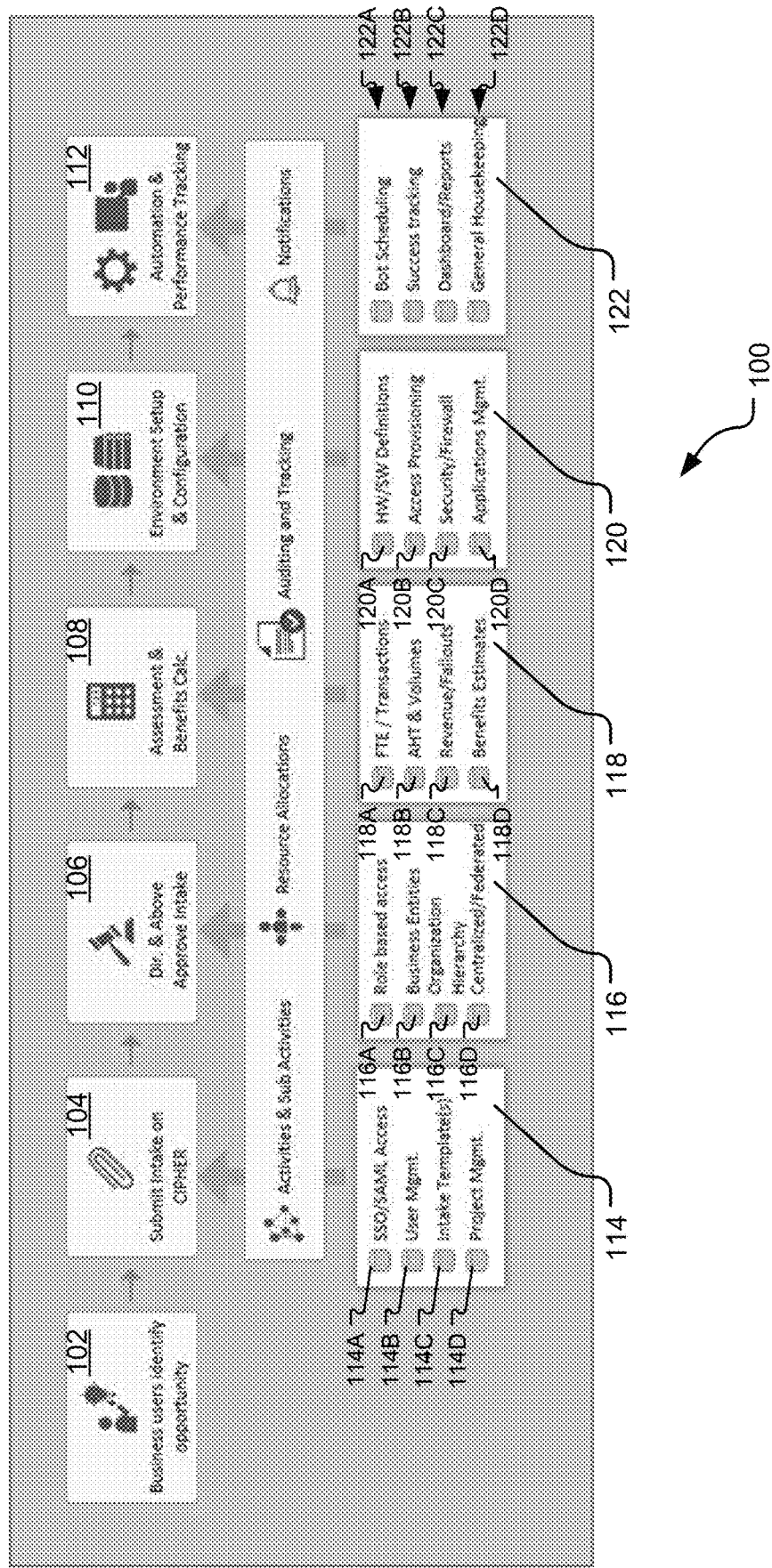
FIG. 1A is a diagram of an example process pipeline for provisioning and tracking software automation projects, in accordance with the subject technology.

Aspects of the present disclosure involve systems, methods, and the like for provisioning a software automation and tracking performance of the software automation throughout its lifecycle. Further, a realized benefit (e.g., due to increased efficiencies, lower staffing overhead, etc.) of deployment of the software automation can be determined and automatically reported according to a schedule. The reports may be provided to certain specified recipients such as project managers, executive officers, sales and/or vendor relations managers, and the like for analysis and processing by the various parties associated with the operation of the software automation.

Software automations, such as bots, robotics process automations (RPAs), and/or business owned applications (BOAs) (e.g., internal websites, etc.), are trainable software applications that can automatically retrieve and/or generate particular data, format and/or provide the particular data to downstream services, and record results (e.g., successes, failures, error reports, etc.) for further processing. In some examples, software automations can provide interoperability between resources or bridge gaps between tracks on a data pipeline.

Through the systems and methods described herein, a software automation project may be managed, from submission of the project to deployment and post-deployment analysis and monitoring. Users of the software automation system may include several parties, including requesters, designers, project managers, executives, and the like from intake of the software automation to financial analysis and planning of deployed automation bots. This all-in-one system provides a platform from which one or more software automation projects may be automatically managed through completion and deployment, improving efficiency of the project and management of all deployed software automations for a more cost-effective suite of such programs.

In one instance of the software automation management system, benefits of the software automations can be determined based the cost of workhours which it replaces. For example, a full time equivalent (FTE) value of software automation can be determined based on the hourly equivalent wage of a fulltime employee spending an average amount of time on a task (e.g., average amount of time spent, as a fractional hour measurement, on the task multiplied by the hourly equivalent wage of the average employee assigned to the ask). Every time the software automation is run, the calculated FTE can be determined and the result used as a realized benefit. Further, the aggregated benefit over a course of time can be compared to the cost of provisioning the software automation (e.g., as a capitalized cost, etc.) to determine a total net benefit. In addition, simultaneous software automation executions can be accounted for in determining a benefit value. In some examples, a fallout rate (e.g., an abstracted percentage loss of revenue based on frictional costs and the like) can be applied to determined benefits as well.

A software automation project can be submitted to an intake platform for pre-provisioning treatment and authorizations. In one example, the intake platform may proceed through six intake steps to initiate a provisioning process. Templates with defined fields can receive various intake related information and, in some examples, may generate additional information based on completed, or partially completed, fields of the templates by querying repositories for project management data, template data, user management data, and the like. In particular, an administrative user can set internal authorization (e.g., for validating or moving forward workflow during a provisioning process and the like) for a submitter, requestor, subject matter expert, approver, and the like. For example, based on administrative settings, users flagged as an executive administrator role may be automatically solicited for authorizations and/or comments at various process steps during a software automation provisioning process.

Workgroups can be assigned to identify impacted teams and/or workers of a client for which a software automation is being provisioned. In some examples, this may impact benefits determination or trigger automatic responses by the system.

A submitted project may further receive resource definitions and allocations from one or more users based on role definitions. For example, an executive, such as a CTO or the like, may be given sufficient access to the project account to authorize particular resources to be allocated or barred from being allocated in order to manage project costs. In some examples, business entity information (e.g., for a respective client business entity commissioning a software automation), organization hierarchy data (e.g., an organizational chart, etc.) and/or resource distribution information (e.g., such as whether the provisioned software automation is intended to operate over a distributed/federated system, etc.) can be used to determine offered plans for provisioning the software automation and/or providing adequate authorization to move the project forward.

In some implementations, a software automation project can be managed through structured user data forms. For example, users can be labeled as internal or external (e.g., contract) workers, have various expertise listed, and be added onto or removed from software automation projects monitored by the system. As a result, a distributed workforce, including contract and third-party workers, can be effectively managed throughout a software automation development and launch (e.g., support) lifecycle.

FIG. 1A is a diagram of a process pipeline 100 for managing and provisioning software automation projects. For example, a user may initiate provisioning a software automation and, via pipeline 100, the software automation may manage deadlines, aggregate performance and value information, and update and/or request communications (e.g., authorizations, etc.) from relevant parties (e.g., executive officers, team leads, etc.). As a result, custom software automations can be provisioned efficiently while avoiding process friction that may otherwise consume resources or increase costs.

Business users may first identify an opportunity (102). In some examples, the opportunity may be internal to the firm of the businesses users or a sales opportunity to provide to another firm. An intake can then be submitted (104) that includes key information (e.g., for downstream processes), such as activities and sub-activities for the software automation development and production lifecycle. The intake may retrieve information from internal databases 114A-D for secure sign on, user management, intake templates, project management, and the like.

Intake may then be approved by authorized users and resources (e.g., hardware, developers, licenses, etc.) can be allocated (106). For example, intake authorization can be based on roles, business entity construction, organization hierarchies, and/or assigned project staffing. In some examples, databases 116A-D may store respective information for automating solicitations and/or approvals as necessary (e.g., via email, web application, etc.).

Assessment parameters may be defined for the approved intake and predicted benefits can be calculated (108). In addition, auditing and tracking parameters may be determined. Assessments and benefits calculations may retrieve information from data stores 118A-D in order to identify full time employment (FTE) and/or transaction rates to determine a predicted benefits values. Additionally, average handle time (AHT) and/or transaction volume may be factored into the predicted benefits value (e.g., to include software automation runtimes, etc.). Revenue by transaction and fallout (e.g., failure/non-complete) rates and also historical benefit estimates and the like may be retrieved in order to more accurately predict a benefits value.

The software automation may then be provisioned (e.g., environment and relevant software processes may be deployed and configured) according to parameters determined earlier (e.g., at 104, 106, etc.) (110). Auditing and tracking can be built directly into the provisioned automation software and may interface with data stores 120A-D for resource definitions, provisioning access privileges, security, and application management.

The provisioned software automation may then be used to automate tasks and performance can be automatically tracked (112). Notifications can be sent to relevant entities (e.g., stakeholders, developers, customer service representatives, etc.) and data stores 122A-D can store schedules, tracking statistics (e.g., successful runs, failed runs, etc.), generated reports, and/or other miscellaneous items (e.g., general housekeeping, etc.).

Figure 1B:
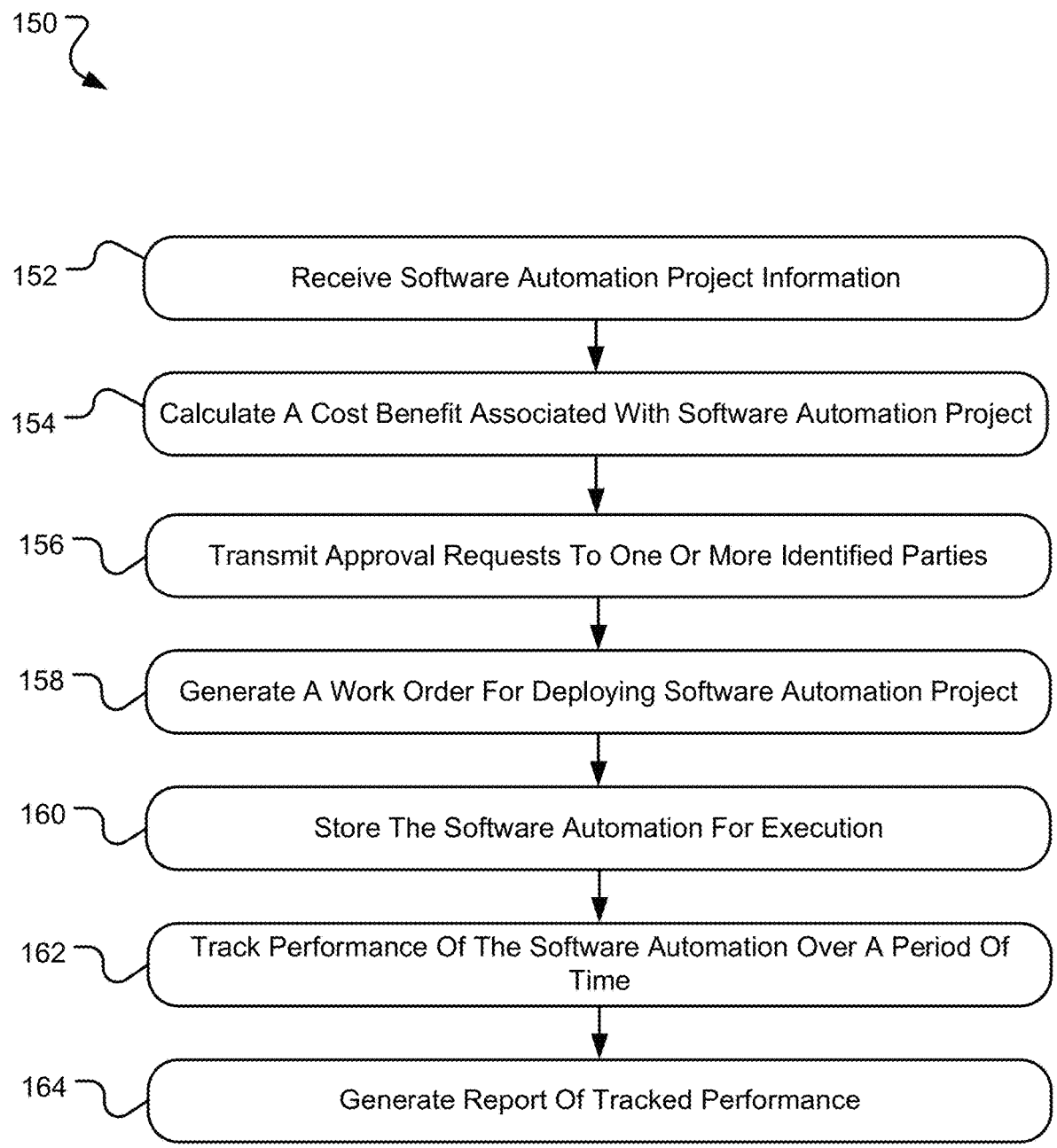
FIG. 1B is a flowchart of a method for a process for provisioning and tracking software automation projects, in accordance with the subject technology.

FIG. 1B is a flowchart of a method for a process for provisioning and tracking software automation projects, in accordance with the subject technology. The operations of the method 150 may be performed in correlation with the process pipeline 100 discussed above for provisioning and tracking deployed software automation projects. The operations may be executed by hardware components of a computing system, software programs, or a combination of hardware and software components.

Beginning in operation 152, software automation project information may be received via a portal or other information gathering system. The software automation project information may include key information for an associated software automation project, such as activities and sub-activities for the software automation development and production lifecycle. The information may also include information retrieved from one or more databases. In general, the software automation project information includes a description of a software automation project and deliverable conditions for completing the software automation project. In operation 154, a calculation of a cost benefit associated with implementation or deployment of the software automation project may be calculated. In one example, the cost benefit may be calculated in relation to a number of man-hours saved for implementation of the automation over a period of time, such as annually. To perform the calculation, information may be retrieved from data stores to identify FTE and/or transaction rates to determine a predicted benefits values.

In operation 156, one or more approval requests may be transmitted to parties identified via the portal. The parties may include individuals or groups associated with the development and deployment of the software automation. Response to the requests may be received from parties based on roles, business entity construction, organization hierarchies, and/or assigned project staffing. In operation 158, a work order may be generated based on the calculated cost benefit and/or received approvals from the notified parties. In one instance, the work order may be generated based on the cost benefit exceeding a benefit threshold value. The work order may include instructions for developing and deploying the software automation to perform an automated task via a computing device. In operation 160, a developed software automation may be uploaded to otherwise stored in a computing device for execution. In one instance, the software automation may be stored in an application server for execution.

In operation 162, a performance of the software automation may be tracked. Tracking of the software automation may include counting a number of attempted executions over a period of time, counting a number of successful executions over the period of time, counting a number of failed executions over the period of time, and the like. In operation 164, a report of the tracking of the software automation may be generated and provided to one or more users of the systems described herein. In one instance, the report of the tracking may also include an indication of the cost savings obtained from use of the software automation over the period of time. Several examples of the generated reports are described in more detail below.

Figure 2:
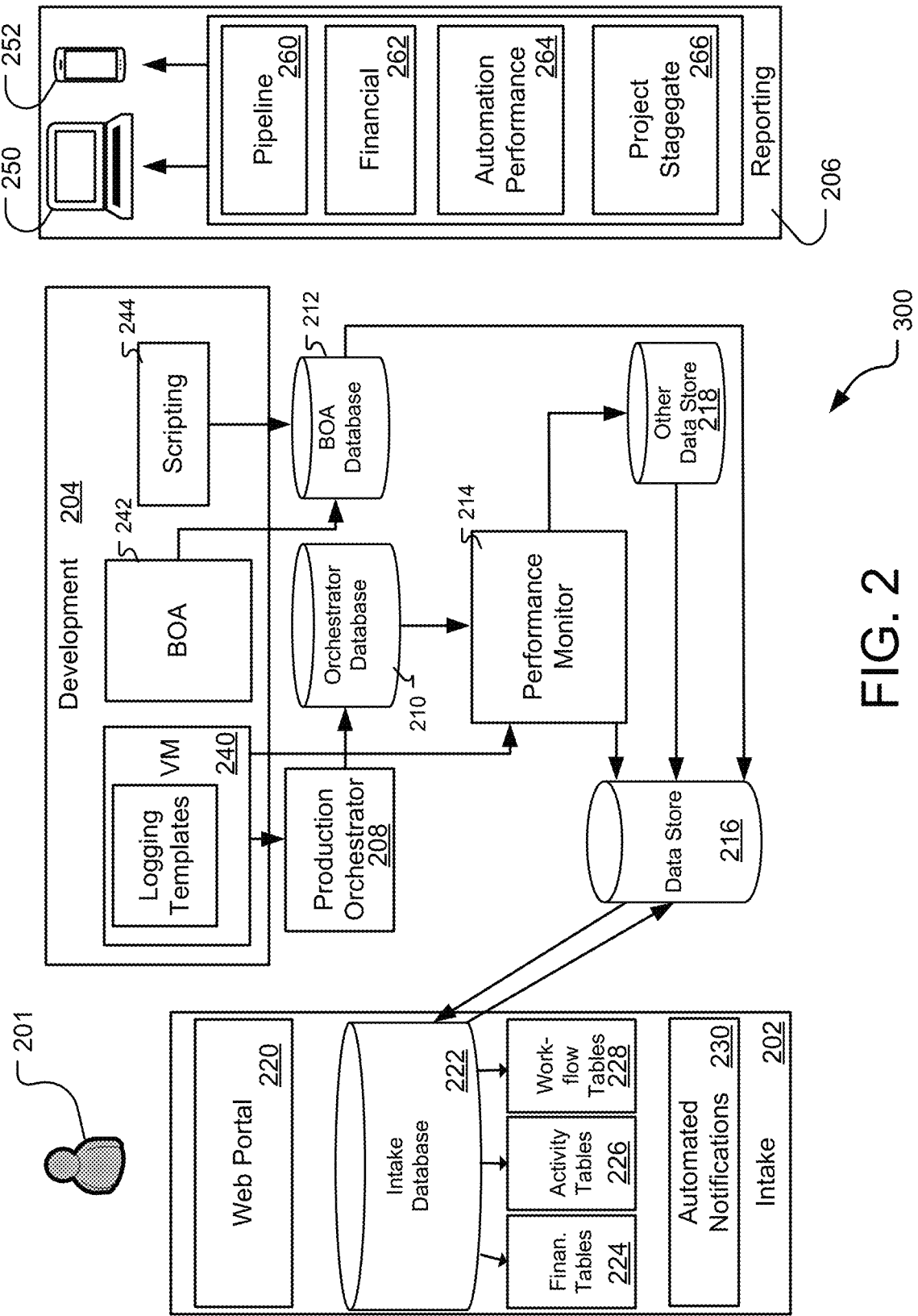
FIG. 2 is a diagram of an example system for provisioning and tracking software automation projects, in accordance with the subject technology.

FIG. 2 is a diagram of a system 200 for deploying software automations and tracking performance of deployed software automations. System 200 includes multiple subsystems with which users 201 may interact. Additionally, subsystems for intake 202, development 204, and reporting 206 can intercommunicate as a single monolith platform, via microservices architecture, or a mix of combined systems and stand-alone systems. Subsystems 202-206 may automatically communicate with each other in order to fulfill requests from users 201 and/or other internal processes (e.g., such as steps in deploying a software automation, etc.) which are part of the operations of system 200 as a whole.

Subsystems 202-206 may share a set of common resources and/or may communicate with external (with respect to each subsystem 202-206) resources. Development subsystem 204 communicates with a production orchestrator 208, which may be an internal application or a third-party service and may include a single application or multiple interfacing applications. Production orchestrator 208 can communicate with an orchestrator database 210 in order to retrieve configuration parameters, histories, permissions, and other information for operation of deployed software automations. For example, and as depicted in FIG. 2, production orchestrator 208 may retrieve logging templates and other orchestration information from orchestrator database 210 to provide to virtual machine (VM) 240. VM 240 can be deployed by development 204 in order to operate already deployed and/or in-development software automations.

Performance monitoring service 214 can collect software automation metrics directly from VM 240 (e.g., by intercepting operations, etc.). In some examples, performance monitoring service 214 may gather metrics information (e.g., output information, endpoint information, etc.) from orchestrator database 210. Performance monitoring service 214 may also retrieve information from other data stores 218 in order to, for example and without imputing limitation, contextualize performance data via comparison to third-party reports (e.g., stocks performance, compliance monitoring services, etc.) and the like. Performance metrics can be stored in a data store 216 which can include one or more databases provided by third-party vendors, etc.

In some examples, such as where a software automation includes, or is entirely, a script or business owned application (BOA) 242, a BOA/script repository 212 may store performance data (e.g., script outputs and inputs, etc.) to data store 216 for later analysis. Information stored in data store 216 may be used to determine software automation performance, usage rates, service gaps, and the like.

BOA/script repository 212 can retrieve information from development subsystem 204. In particular, BOA/script repository 212 may receive information from a BOA component 242 or a scripting component 244 within development subsystem 204. BOA component 242 and scripting component 244 may receive commands from users 201 for configuration and deployment of BOAs and/or scripts.

Intake subsystem 202 may receive inputs from users 201 for initializing provisioning and reporting processes during provisioning, deployment, and operation of a software automation. For example, intake subsystem 202 can guide users 201 through a series of surveys (further discussed in FIGS. 4A-F below) to obtain information for either or both of developing the software automation and/or monitoring the software automation after deployment. In some examples, users 201 may interact with intake subsystem 202 via a web portal 220. Web portal 220 may provide surveys (e.g., as described above), reporting interfaces (e.g., by retrieving information from reporting subsystem 206), account management, and the like.

Intake subsystem 202 can also include an intake database 222 which may be in communication with data store 216 for reading and writing data into storage related to intake processes. Further, intake database 222 may store financial tables 224, activity tables 226, and workflow tables 228 for intake of new projects. In some examples, the surveys provided to users 201 may be based on the financial tables 224, activity tables 226, and/or workflow tables 228. Additionally, an automated notifications component 230 can notify specified (e.g., as part of an intake survey) contacts of financial thresholds, activity events, and/or changes in workflow based on the financial tables 224, activity tables 226, and workflow tables 228.

Reporting subsystem 206 can include various reporting interfaces for providing users 201 with individuated and/or aggregated information about the provisioning, deployment, and/or performance of software automations. A pipeline component 260 can provide reports detailing aggregated information for projects through a pipeline (discussed further in FIG. 6 below). A financials component 262 can provide reports detailing aggregated information for predicted benefits, realized benefits, benefits based on software automation type, and similar information (discussed further in FIGS. 7A-C below). A software automation performance component 264 can provide reports detailing aggregated information for performance of software automations based on various constraints (discussed further in FIGS. 8A-F below). A stagegate component 266 can provide reports detailing aggregated information for progress of projects across various stages of a development pipeline (discussed further in FIG. 9 below).

Figure 3:
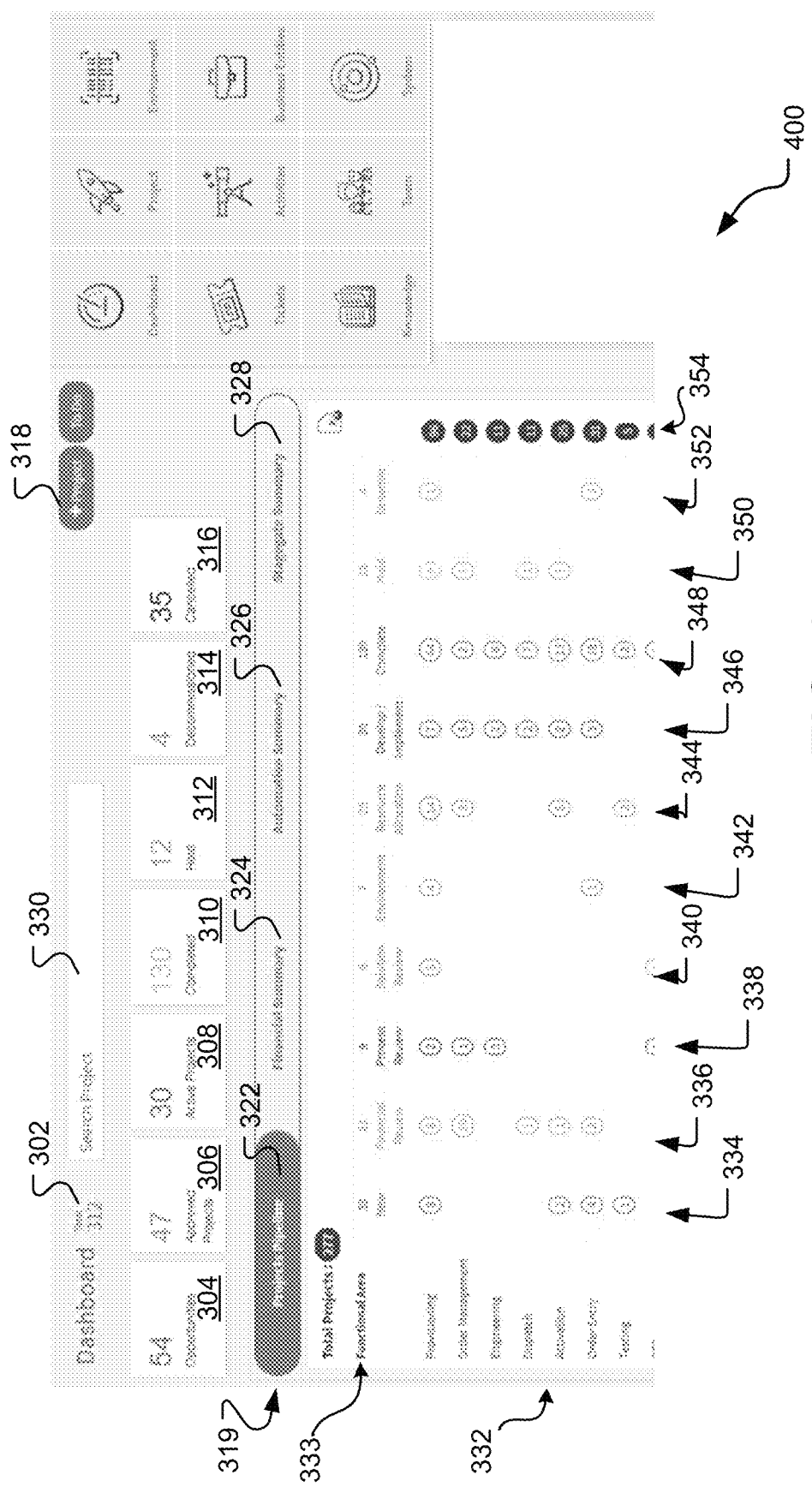
FIG. 3 is a diagram of an example dashboard interface for software automation projects, in accordance with the subject technology.

FIG. 3 depicts a dashboard interface 300 through which, for example, users 201 may interact with system 200. Users 201 who are authorized to access system 200 may log in via web portal 220 and be greeted with dashboard interface 300, through which various other interfaces may be accessed.

The interface 300 may include a count 302 of a total number of projects being managed is viewable by users and may, for example, represent a sum of project opportunities count 304, approved projects count 306, active projects count 308, completed projects count 310, held projects count 312, decommissioned projects count 314, and cancelled projects count 316, which may each also be respectively displayed in dashboard interface 300.

A view menu 319 can include a projects pipeline view 322, financial summary view 324, automation summary view 326, and stagegate summary view 328. Each view of view menu 319 may provide a respective collection of visualizations and aggregated information covering various aspects of a software automation pipeline (discussed in FIGS. 6-9 below). Here, projects pipeline view 322 is selected and so a projects summary interface 332 may be seen. Additional interfaces within projects pipeline view 332 are discussed further below in reference to FIG. 6.

Projects summary interface 332 summarizes current projects in a respective pipeline according to functional area type 333 and pipeline stage 334-352. Additionally, the projects of each functional area type 333 may be tallied in order to generate a total projects by functional area column 354 for at a glance of review of all projects within the pipeline. In some examples, functional area types 333 may be organized as rows and pipeline stages 334-352 may be organized as columns, as rendered by projects summary interface 332.

Functional area type 333 can include, for example and without imputing limitation, the following functional areas: "provisioning", "order management", "engineering", "dispatch", "activation", "order entry", "testing", and more. Pipeline stages 334-352 may include, for example and without imputing limitation, "new", "financial review", "process review", "solution review", "environment", "resource allocation", "develop/implement", "complete", "hold", and "decommission". Further, each respect pipeline stage 334-352 may include a respective tally of how many projects are currently within the respective pipeline stage. Here, for example, new pipeline stage 334 includes a tally of 33, indicating that there are 33 projects new to the projects pipeline across all functional areas. Similarly, financial review pipeline stage 336 includes a tally of 21, process review pipeline stage 338 includes a tally of 9, solutions review pipeline stage 340 includes a tally of 6, environment pipeline stage 342 includes a tally of 7, resource allocation pipeline stage 344 includes a tally of 25, develop/implement pipeline stage 346 includes a tally of 30, complete pipeline stage 348 includes a tally of 130, hold pipeline stage 350 includes a tally of 12, and decommission pipeline stage 352 includes a tally of 4. Furthermore, in some examples, each pipeline stage 334-352 and respective columns may be color coded to further distinguish each one from each other.

Users can search for specific projects via a search bar 330. Further, in order to add a new project, an add project button 318 in dashboard interface 300 may interacted with. Add project button 318 may trigger a multi-step intake survey, as discussed below.

FIGS. 4A-F depicts a multi-step intake survey which may be initiated by a user interacting with add project button 318 and the like. In particular, each step of the multi-step intake survey may solicit information used for provisioning and monitoring a deployed software automation. A tracker 401 indicates the current step throughout each view/step of the multi-step intake survey.

An overview step 400 may receive high level descriptive information for a new project. In particular, a business unit dropdown tab 402 enables selection of a business team or group for which the new project is to be commissioned. A functional area dropdown tab 404 enables selection of a functional area (e.g., for updating functional area type 333 tallies, etc.). A title field 406 enables a user to provide a name for the new project. A problem statement field 408 and an automation description field 409 enable a user to describe the reason for the new project (e.g., what problem does it solve) and a description of a process to be automated (e.g., by a software automation). In particular, problem statement 408 may be used to solicit and provide authorizations for development of the new project and automation description 409 may be used to provision the new project (e.g., by developers during development, environment set up, etc.).

Figure 4A:
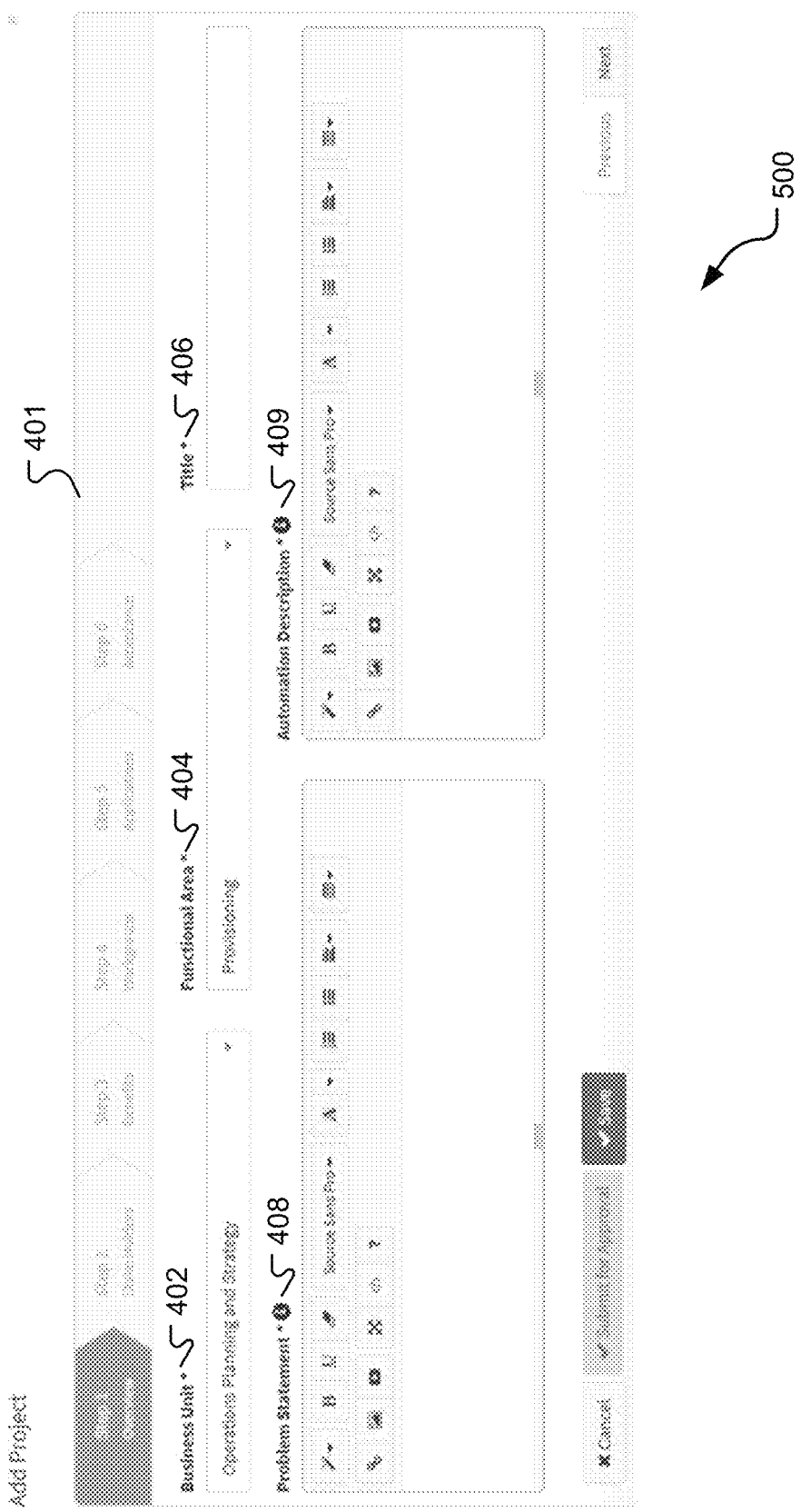
Figure 4B:
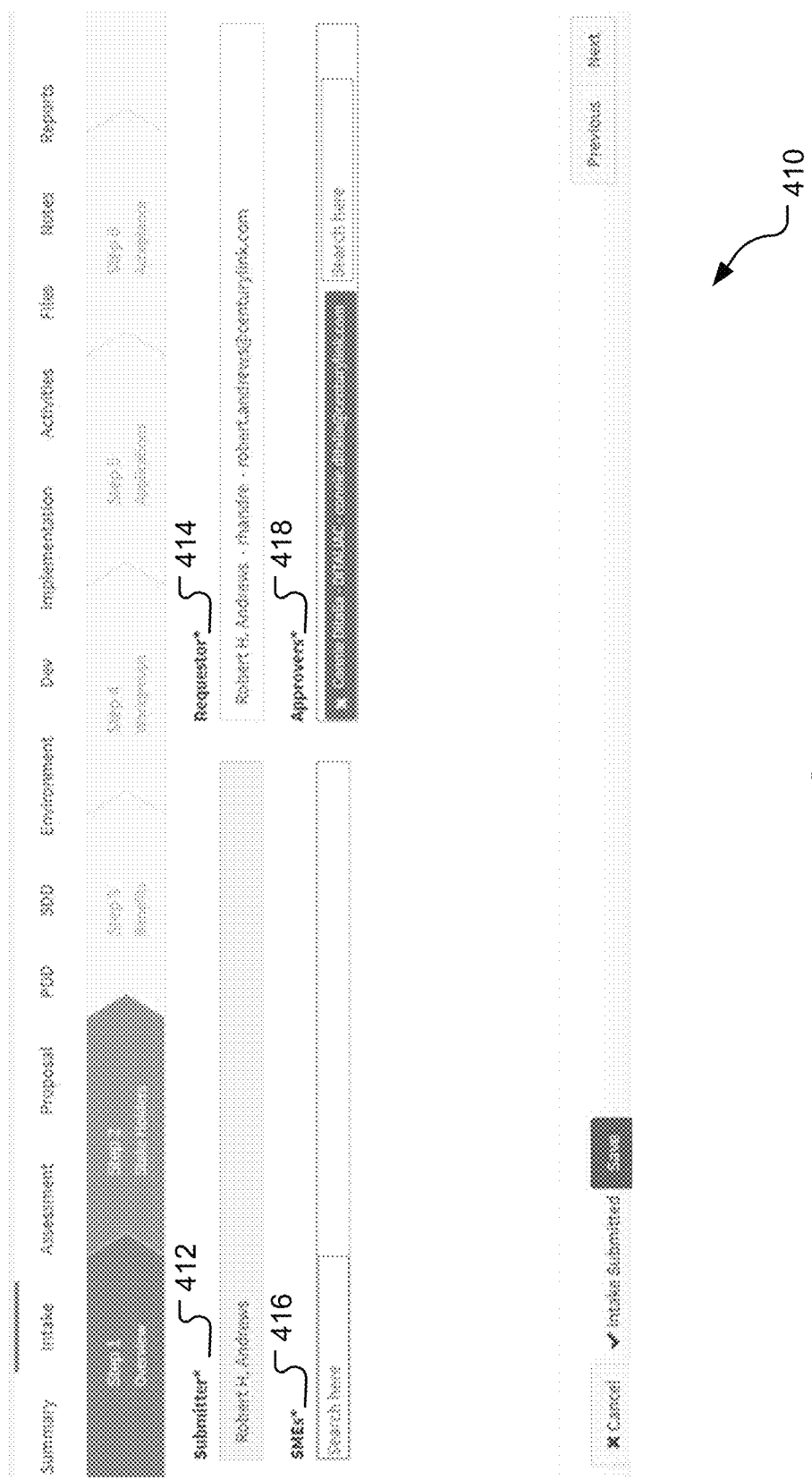

A stakeholder's step 410 as seen in FIG. 4B may receive identification of key entities for authorizing the new project. A submitter field 412 can receive, automatically via user login, the name or similar identifier of the user submitting the new project. A requestor field 414 may receive identification of a person or entity requesting approval of the new project. In some examples, requestor field 414 may further include contact information (e.g., to be provided to identified stakeholders for further discussion as needed). In the illustrated example, requestor field 414 and submitter field 412 identify the same user; however, in some examples the respective fields may be different such as when a user has authorization to submit a new project on behalf of a requestor (e.g., such as in the case of an assistant, secretary, etc.).

A subject matter experts (SMEs) field 416 may receive identification of relevant SMEs for approval and/or consultation regarding approval of the new project. SMEs may include, for example and without imputing limitation, technical specialists, development leads, specialists in the respective functional area, and the like. An approver's field 418 may receive identification of relevant approvers such as department heads, executive officers, and the like. In some examples, either or both of SMEs field 416 and approvers field 418 may include a search function for selecting relevant SMEs and/or approvers from a stored list of SMEs and/or approvers.

A benefits step 430 illustrated in FIG. 4C may receive information for predicting a financial benefit from the new project following deployment. The predicted financial benefit and received information can be used to provide detailed monitoring reports following deployment. Benefits step 430 can include, by example and without imputing limitation, a volume field 432, an AHT field 434, a cost model selector 436, a FTE rate field 438, annual operating expense opportunity field 437, a fallout rate selector 431, an annual fallout cost field 433, revenue opportunity toggle 435, and a total estimated annual benefits field 437.

Volume field 432 may include a quantity field and a dropdown tab for selecting a period during which an input quantity is processed (e.g., number of yearly service changes, etc.). AHT field 434 may include a numeric field and a dropdown tab for selecting time type (e.g., a number of minutes for manually processing each individual service charge, etc.). Cost model selector 436 may include a FTE selection and a transaction selection. Where the FTE selection is activated, benefits can be predicted based on a model using full time employment information for relevant workers (e.g., as a product of volume, fractional hours spent handling each item, and an hourly rate for a full time employee working the item). Where the transaction selection is activated, benefits can be predicted based on a model using a cost for each transaction (e.g., as a product of volume and transaction cost, etc.).

In some examples, the FTE selection may cause the FTE rate field 438 to be available to the user. In particular, FTE rate field 438 can include a pay quantity field and a pay period dropdown tab (e.g., to provide an hourly wage, yearly salary, etc.). Annual operating expense opportunity field 437 may be automatically calculated and filled based on the above information (e.g., according to a FTE cost model or a transaction cost model, etc.). In addition, fallout rate selector 431 can include a slider or similar adjustable component in order for a user to indicate an expected rate of a deployed software automation successfully completing a transaction (e.g., a 10% fallout rate may indicate that the deployed software automation is expected to fail to complete approximately 10% of transactions, etc.). Fallout rate selector 431 can then be applied to annual operating expense opportunity calculator to determine, and automatically complete, annual fallout cost field 433, which may display a predicted dollar amount cost of the indicated fallout rate. Annual operating expense opportunity field 437 and annual fallout cost field 433 can be used to automatically complete total estimated annual benefits field 437 (e.g., as a sum of the two fields, etc.). Revenue opportunity toggle 435 may be set to indicate whether each transaction can generate revenue. In some examples, where revenue opportunity toggle 435 is set to "yes", benefits step 430 may further solicit revenue realization rates, quantities, and the like in order to more accurately predict total estimated annual benefits field 437 (e.g., accounting for revenue realized by a deployed software automation, etc.).

Figure 4D:
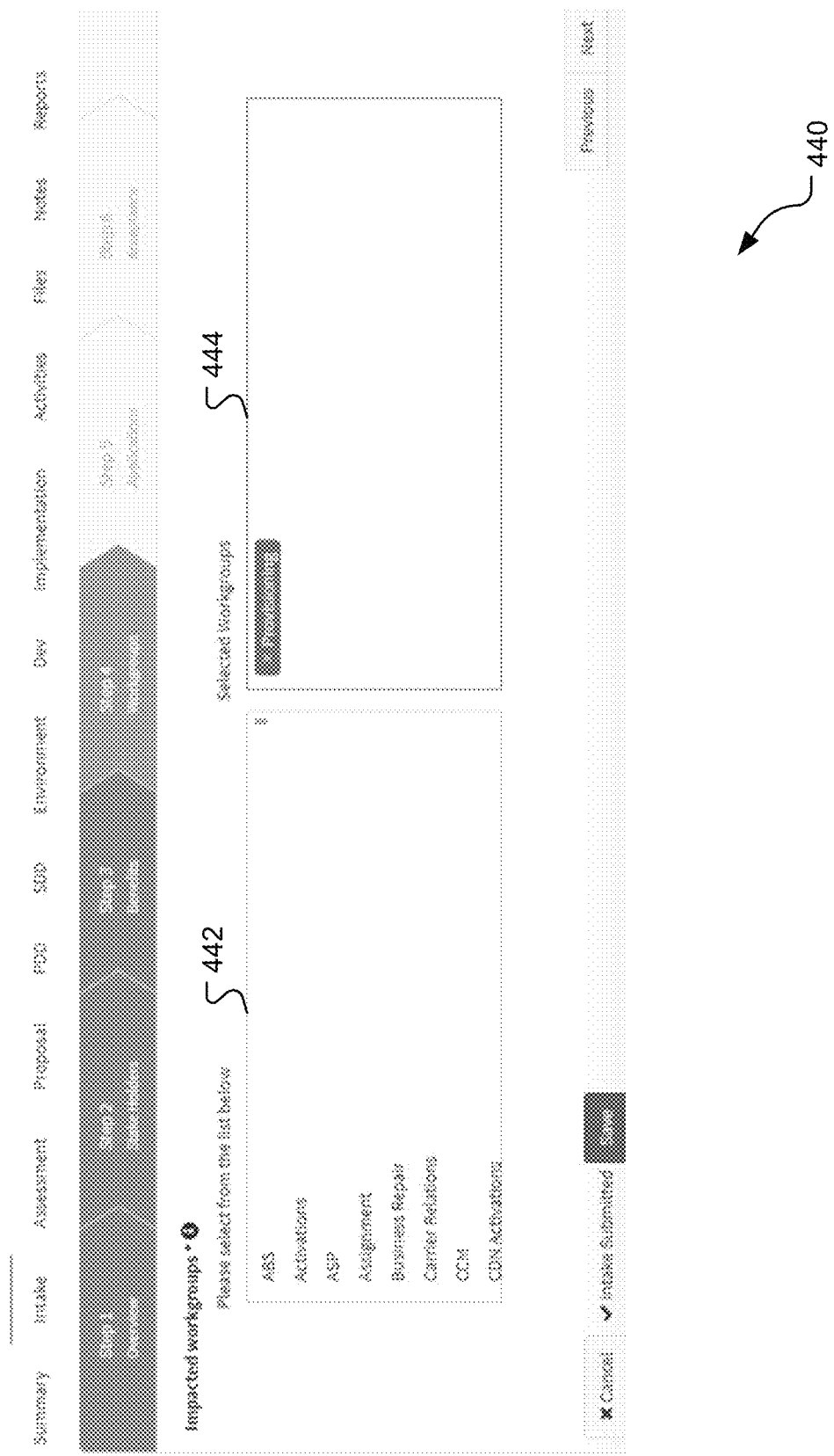

A workgroups step 440 illustrated in FIG. 4D can receive information regarding impacted workgroups related to the new project. Impacted workgroups may include teams, divisions, groups, etc. which are anticipated to experience an impact in workflow (e.g., removing or adding tasks, etc.) as a result of the eventual deployed software automation. In particular, workgroups step 440 may include a selections list 442 and a selected workgroups list 444. Selected workgroups list 444 can be populated by selecting workgroups included in selection list 442.

Figure 4E:
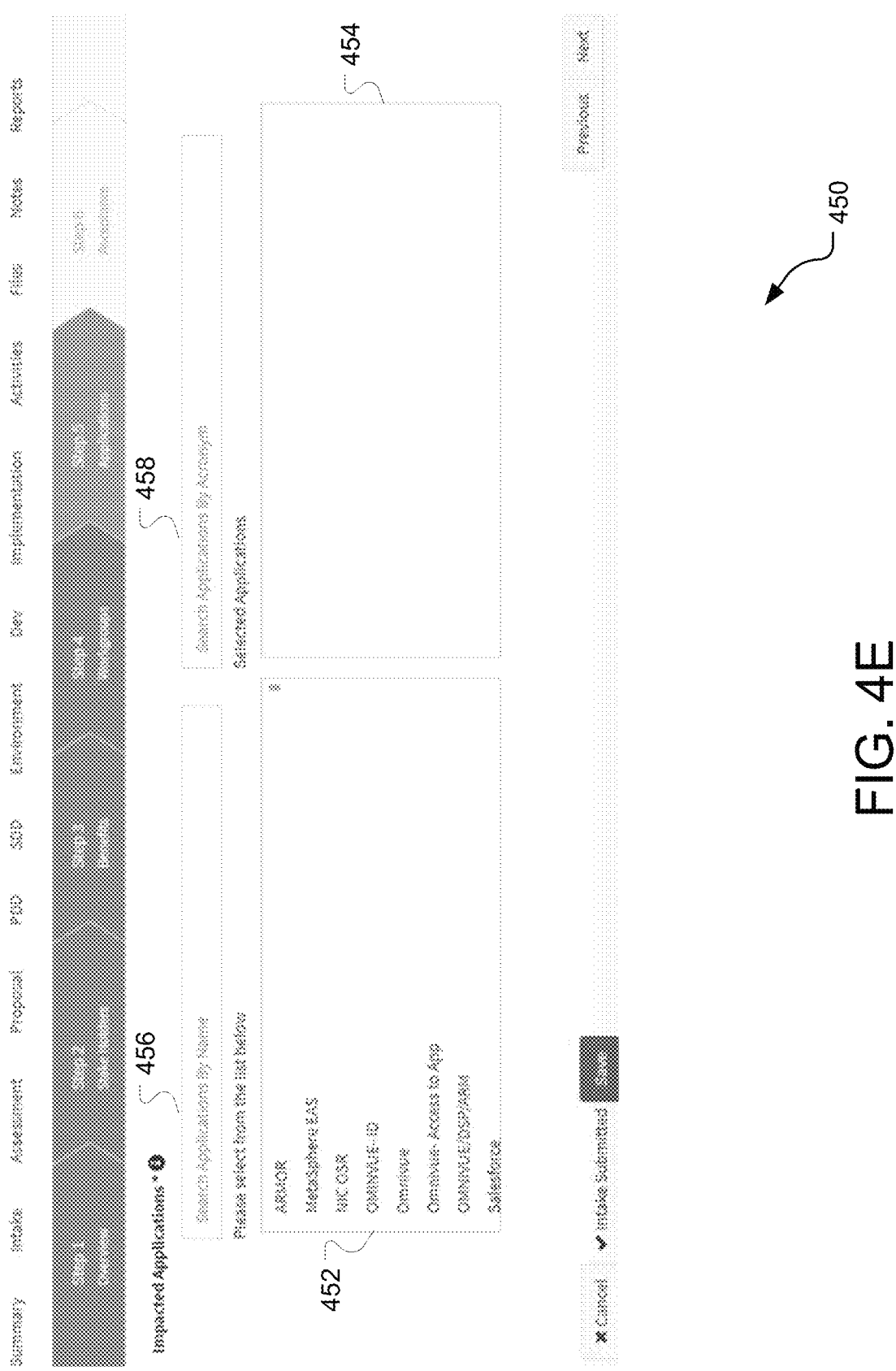

An applications step 450 illustrated in FIG. 4E may receive information regarding impacted applications related to the new project. Impacts to applications may include, for example, workflow interactions (e.g., a deployed software automation changes the way users interact with an application), application availability, application integrations, and the like.

Applications step 450 may include an application name search field 456 and an application acronym search field 458 for searching for an application by name and acronym, respectively. Additionally, an application candidate list 452 may enable manual selection of impacted applications (e.g., directly from application candidate list 452). Nevertheless, applications selected manually, by name, or by acronym may be added to a selection applications list 454.

Figure 4F:
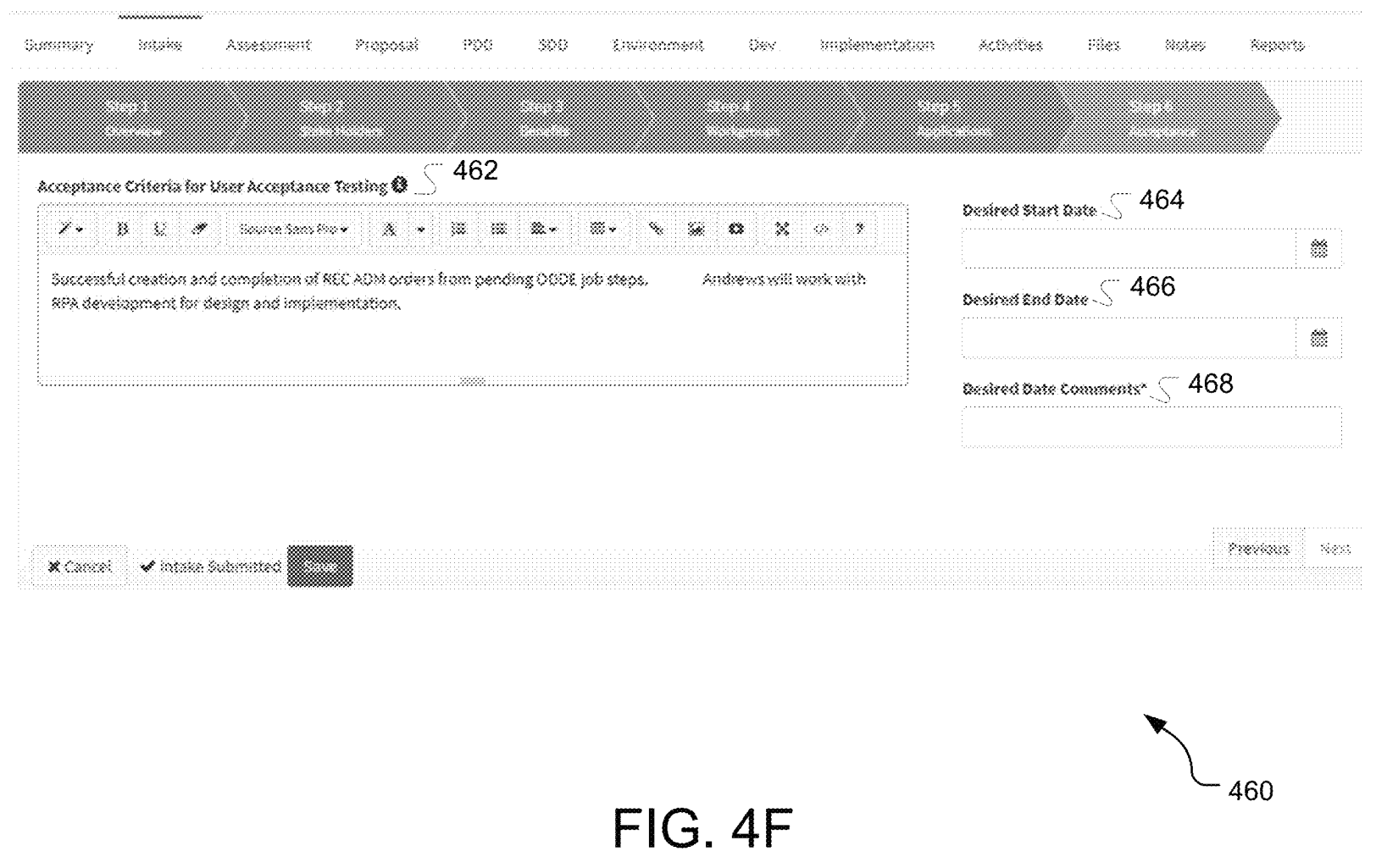

An acceptance step 460 illustrated in FIG. 4F may receive information for benchmarking or validating a software automation for deployment. In particular, information provided to acceptance step 460 can be used to determine acceptance procedures for a software automation from the new project.

An acceptance criteria field 462 enables a user to input procedures and specifications for accepting an output product of the new project. A desired start date field 464 may receive a start date for the new project. A desired end date field 466 may receive a desired completion date for the new project (e.g., at which time, content of acceptance criteria field 462 may be applied). Additionally, a desired date comments field 468 may receive additional notes related to the desired start and/or end dates such as whether the dates are tentative, etc.

The intake survey may complete when acceptance step 460 is fully filled out. The completed intake survey may be provided to downstream processes and/or entities (e.g., stake holders for authorization, etc.) in order for the new project to be reviewed and/or authorized for initiation.

Figure 5A:
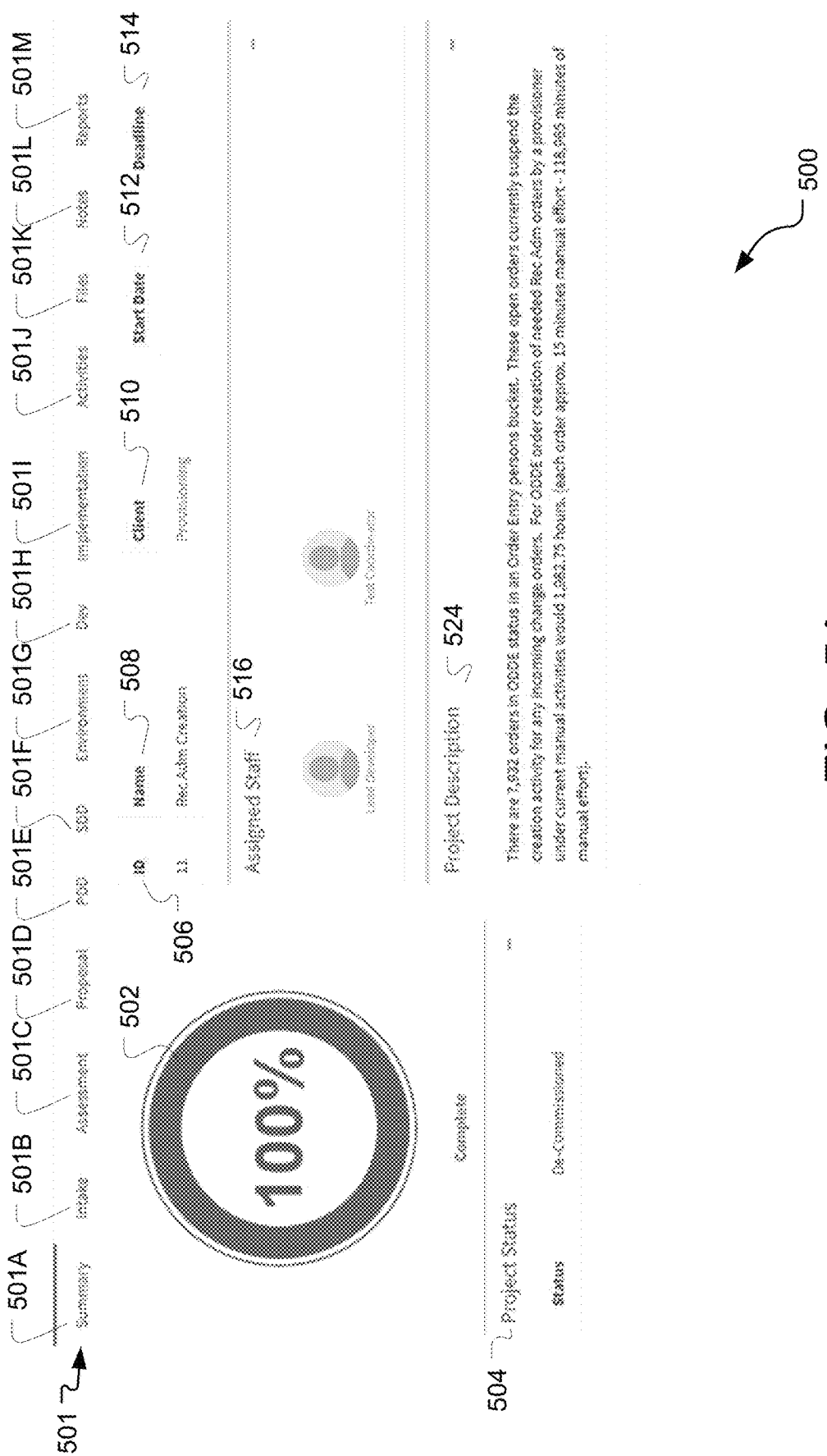
FIGS. 5A and 5B are example interfaces for reviewing a software automation project, in accordance with the subject technology.
Figure 5B:
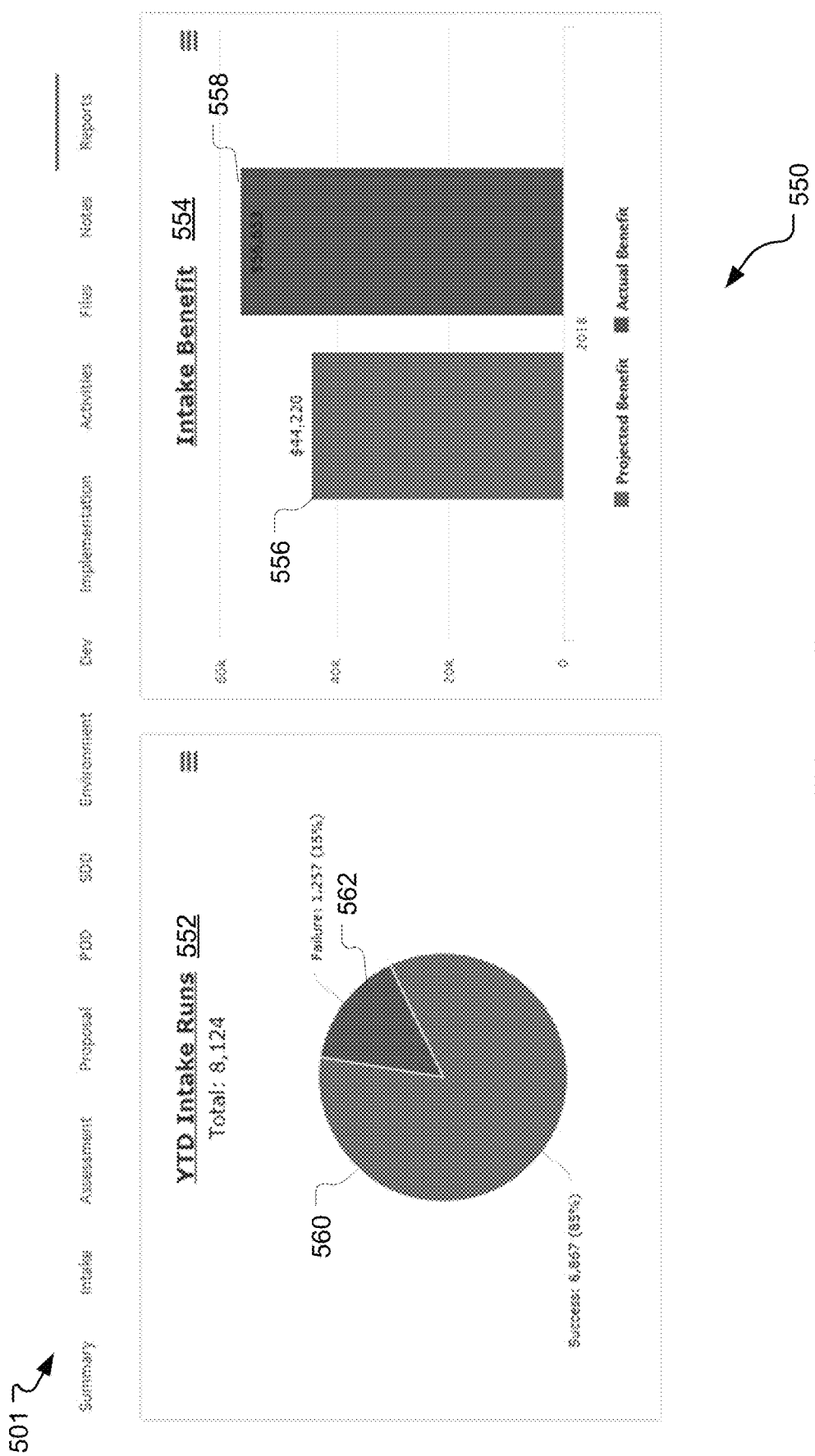

FIGS. 5A-B depict project-specific views which may be accessed through dashboard interface 300 (e.g., via search bar 330). FIG. 5A depicts a project summary view 500. Project summary view 500 includes information related to the lifecycle of a particular project. From project summary view 500, users can navigate to a project reports view 550 (further discussed below in reference to FIG. 5B), or any of a menu of other project-specific views via a navigation bar 501. Navigation bar 501 can include a plurality of different project-specific tabs for navigating between project-specific views, such as, for example and without imputing limitation, summary tab 501A, intake tab 501B, assessment tab 501C, proposal tab 501D, PDD tab 501E, SDD tab 501F, environment tab 501G, dev tab 501H, implementation tab **501*l*, activities tab 501J, files tab 501***k*, notes tab 501L, and reports tab 501M. In some examples, each project-specific view may be at least partially prepopulated by information provided via the new project intake survey (e.g., FIGS. 4A-F).

Project summary view 500 may include a project completion meter 502, project status field 504, detailed information, staffing information, and a project description 524. As a result, user can quickly review where a project is in a respective project lifecycle. Detailed information can include an identification code 506, project name 508, project client 510, project start date 512, and project deadline 514. Staffing information may include assigned staff list 516 which identifies staff assigned to the project.

FIG. 5B depicts projects reports view 550, from which users can quickly review project operational information such as successful runs and/or realized benefits. In particular, projects reports view 550 may include a runs chart 552 and a benefits graph 554. Runs chart 552 may include a graphical comparison of successful project runs 560 to failed project runs 562 (e.g., as a pie chart, etc.). In comparison, benefits graph 554 can include a graphical comparison of projected benefits 556 to realized benefits 558 (e.g., as a bar graph, etc.). In some examples, compared values may further be color coded and the like to more easily distinguish compared values.

Figure 6:
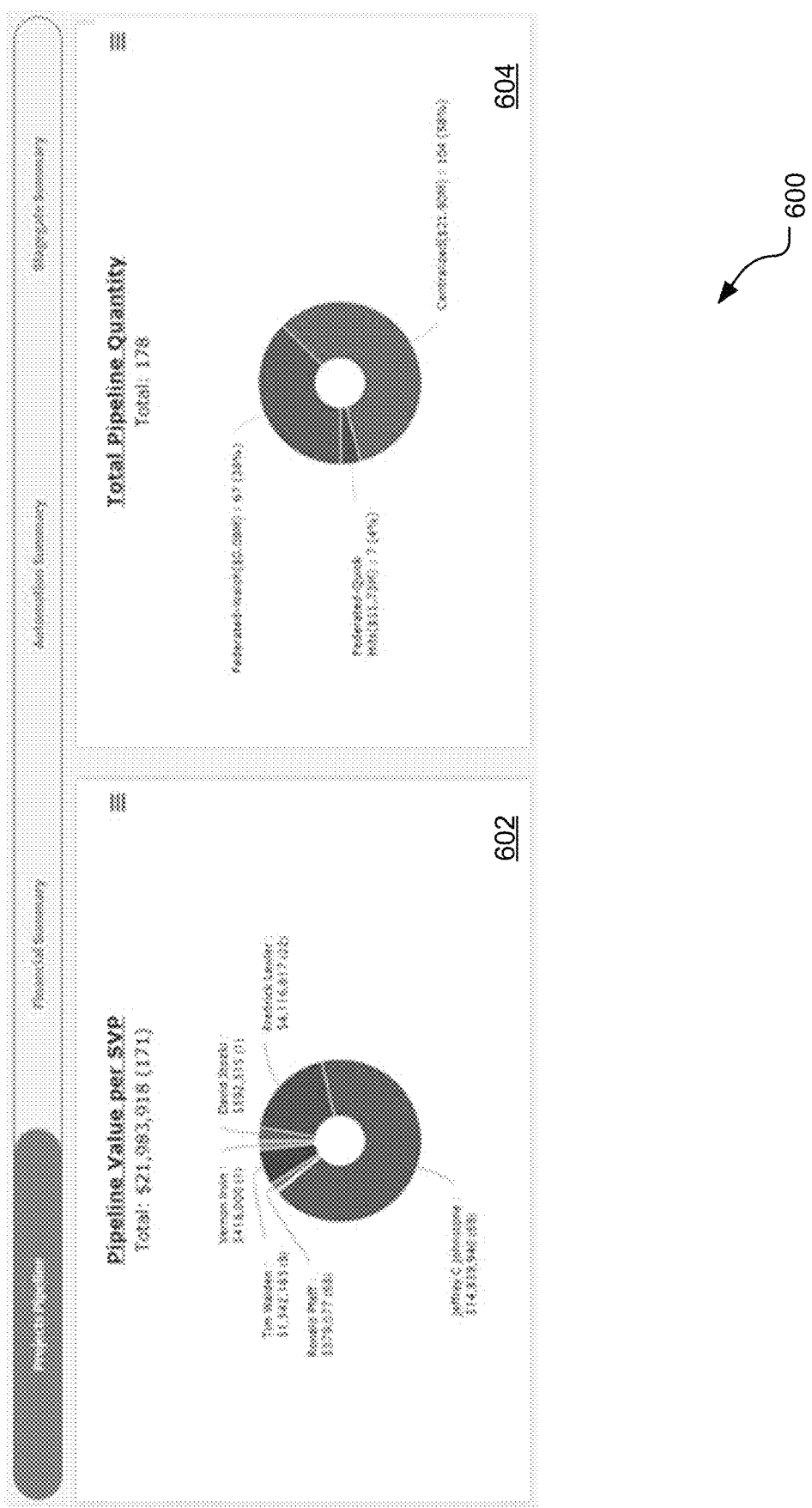
FIG. 6 is an example interface for reviewing aggregated software automation project pipelines, in accordance with the subject technology.

FIG. 6 depicts a projects pipeline view 600 which, in some examples, may be included with projects pipeline view 332 (discussed above in reference to FIG. 3). Projects pipeline view 600 may depict aggregated information for project value across an entire pipeline. In particular, projects pipeline view 600 can include a pipe value chart 602 and a pipeline quantity chart 604. Pipeline value chart 602 may provide a view of value aggregations of projects within the pipeline according to project leads or the like (e.g., as a pie chart, ring chart, etc.). Likewise, pipeline quantity chart 604 may provide a view of aggregations of projects within the pipeline according to project classifications or the like (e.g., as a pie chart, ring chart, etc.).

Figure 7A:
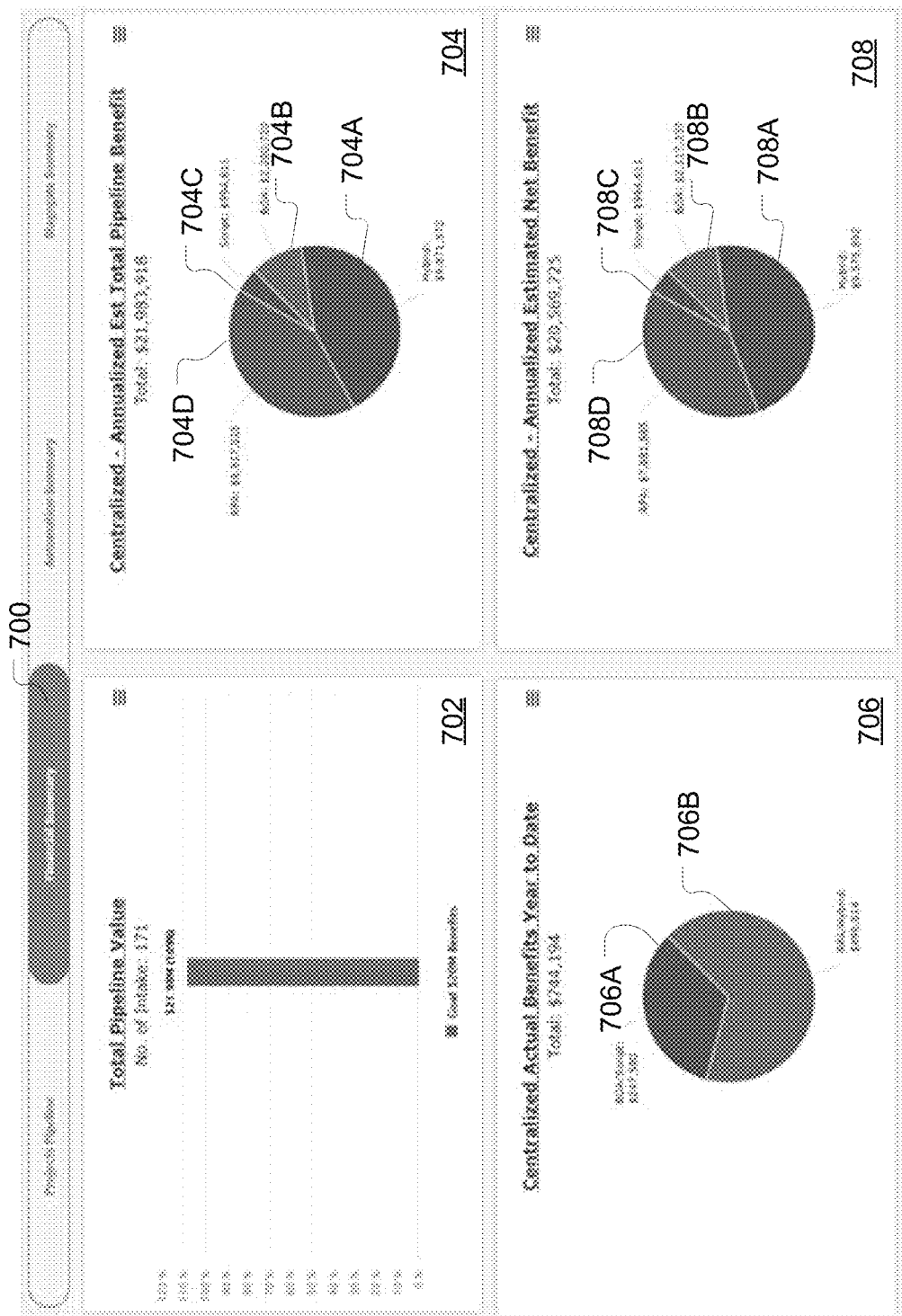

FIGS. 7A-C depict various graphical depictions of pipeline information that may be included in a financial health view 700. Financial health view 700 can provide easily accessible financial information related to software automation projects within a pipeline, such as aggregated financial benefits information from all projects or particular types of projects.

Financial health view 700 may include a total pipeline benefits value graph 702. Total pipeline benefits value graph 702 display a visualization (e.g., a bar chart, etc.) of predicted and/or realized monetary value of benefits for projects across the entire pipeline. Other visualizations may provide more granular information regarding benefits value for particular types of projects according to staffing or project type parameters.

A centralized total estimated pipeline benefit chart 704 may display a visualization (e.g., pie chart, etc.) of internally developed (e.g., centralized) projects total estimated benefits. In some examples, the visualization can include demarcated project types, such as hybrid wedge 704A, BOA wedge 704B, script wedge 704C, and RPA wedge 704D in order for users to quickly discern relative benefits contribution according to project types.

A centralized actual pipeline benefit chart 706 may display a visualization of internally developed projects actual benefit values. In some examples, the visualization may include demarcated project types, such as BOA/script wedge 706A and RPA/hybrid wedge 706B. A centralized estimated net pipeline benefit chart 708 may display a visualization of internally developed projects estimated net benefit values. In particular, centralized estimated net pipeline benefit chart 708 displays the monetary benefit value, by type, of projects within the pipeline less the cost of development and deployment. In some examples, the visualization may include demarcated project types, such as hybrid wedge 708A, BOA wedge 708B, scripts wedge 708C, and RPA wedge 708D.

FIG. 7B depicts additional charts specific to particular project types and which may be navigated to within financial health view 700. In particular, a total RPA pipeline benefit chart 710 displays a visualization of a monetary benefit value of RPA projects within the pipeline. Additionally, total RPA pipeline benefit chart 710 can include stage demarcations in the form of an in-progress wedge 710A, indicating the monetary benefit value of RPA projects currently being developed, and a completed wedge 710B, indicating the monetary benefit value of RPA projects that have already been completed. A total BOA/script pipeline benefit chart 712 may likewise display a visualization of monetary benefit value of BOA and script projects within the pipeline. Total BOA/script pipeline benefit chart 712 can include stage demarcations in the form of an in-progress wedge 712A, indicating the monetary benefit value of BOA/script projects currently being developed, and a completed wedge 712B, indicating the monetary benefit value of BOA/script projects that have already been completed.

FIG. 7C depicts additional charts specific to particular staffing types, such as short-term, temporary, contract, and/or full-time developers in order to, for example, appraise productivity of a workforce respective to a particular software automation pipeline. For example, a TCS/prodapt in-progress pipeline benefit chart 714 may display a visualization of the monetary benefit value of projects in the pipeline currently being worked on by specified teams or groups (e.g., TCS and Prodapt staff, etc.). In some examples, the monetary benefit value contribution of each team may be individually distinguished by demarcations, such as prodapt wedge 714A and TCS wedge 714B.

In some examples, charts can be narrowed or broadened to include fewer or more teams, respectively. An all development teams in-progress pipeline benefit chart 716 may display a visualization of the monetary benefit value of projects in the pipeline currently being worked on by all teams within the pipeline. All development teams in-progress pipeline benefit chart 716 may include demarcations for each team/staffing type in order to better distinguish a monetary benefit value contribution for each team. For example, demarcations may include a Prodapt wedge 716A, a TCS wedge 716B, a mixed team member's wedge 716C, and an employee's wedge 716D.

While charts 702-716 are discussed in this disclosure as particular chart types, it will be understood by a person having ordinary skill in the art that any other chart type may be used without departing from the spirit of the disclosure. For example, bar charts, pie charts, frequency charts, plots, and various other data visualizations as will be understood by a person having ordinary skill in the art may be used. Further, charts 702-716 may retrieve data automatically from, for example, data store 216 in response to user selections and the like.

FIGS. 8A-F depict an automation summary view 800 for monitoring deployed software automations. Automation summary view 800 may enable users to quickly review usage and success rates of deploy software automations, deployed and/or active software automation counts over the pipeline, and other useful information related to monitoring deployed software automations.

Figure 8A:
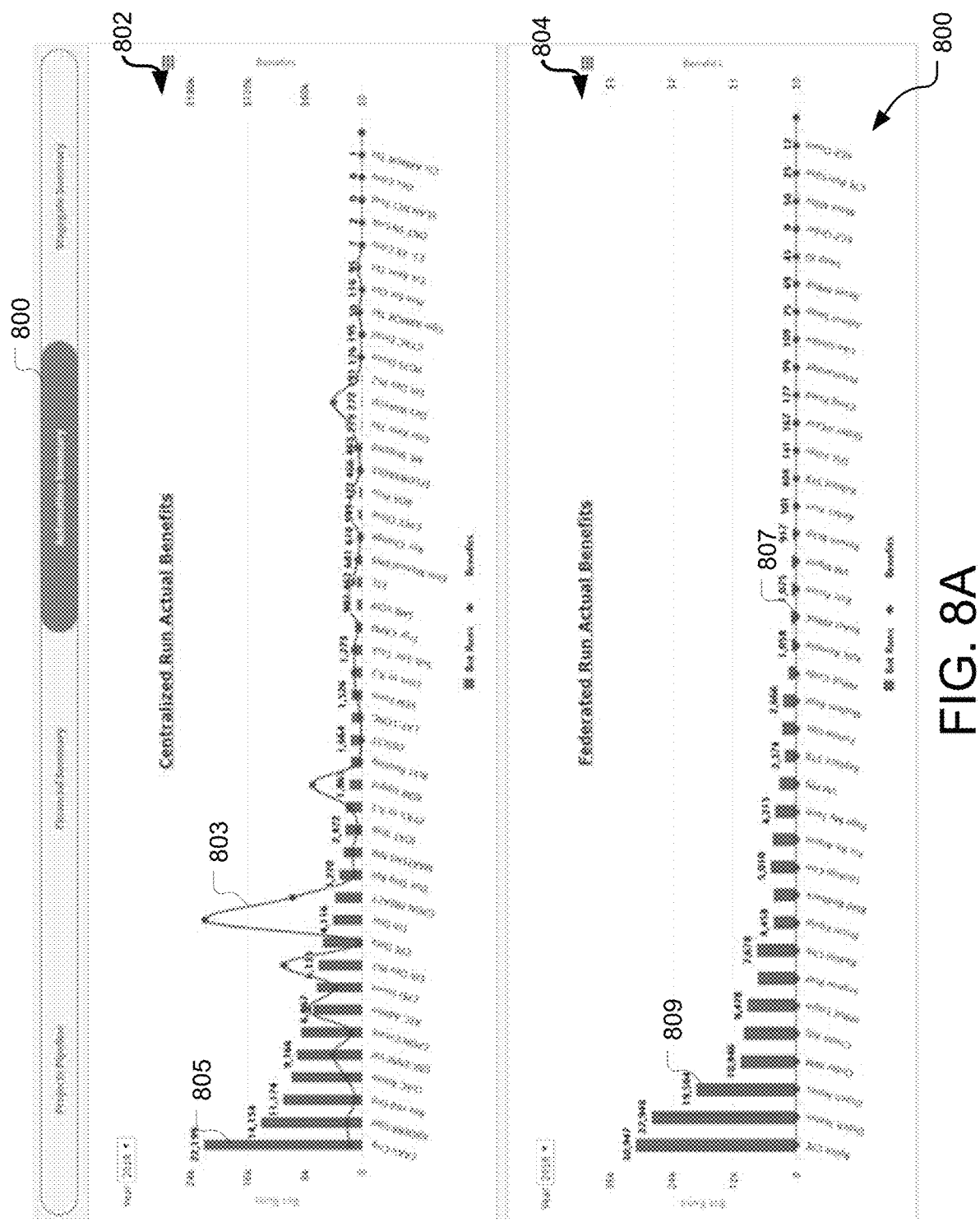

FIG. 8A depicts a centralized benefit/software automation runs chart 802 and a federated benefit/software automation runs chart 804, which may be included in automation summary view 800. Centralized benefit/software automation runs chart 802 includes a benefit plot 803 and a software automation run counter 805 (e.g., as a bar chart, etc.) for software automations run from a centralized location, such as off a hosted server or resource and the like. In some examples, data may be queried directly from orchestration database 210, or data stores 216, 218 in order to generate centralized benefit/software automation runs chart 802.

Federated benefit/software automation runs chart 804 also includes benefit plot 807 and software run counter 809. In comparison, federated benefit/software automation runs chart 807 reflects the number of runs and monetary benefit value amount of particular software automations that are provisioned over a distributed (e.g., federated) architecture. In some examples, federated benefit/software automation runs chart 807 may include data provided by third-party resources and/or data stores via, for example, exposed APIs and the like.

FIGS. 8B-F depict additional automation information according to software automation type (e.g., centralized and/or federated RPA, BOA, script, etc.), which may be included in automation summary view 800. FIG. 8B depicts a centralized RPA benefit/software automation runs chart 825 which may provide an at a glance view of benefit value and usage level of each RPA in the pipeline. Centralized RPA benefit/software automation runs chart 825 includes a benefit plot 822 reflecting a total monetary benefit value for each RPA and run volume indicators 824 reflecting a total number of runs (e.g., software automation executions) of a respective RPA. Run volume indicators 824 may further include a successful run portion 826 and an unsuccessful run portion 828 reflecting a proportion and quantity of successful and unsuccessful RPA runs.

A centralized BOA benefit/software automation runs chart 850 provides an at a glance view of benefit value and usage level of each BOA in the pipeline. Centralized BOA benefit/software automations runs chart 850 includes a benefit plot 854 and run volume indicators 856. Here, centralized benefit/software automation runs chart 850 includes successful run portion 858 and does not include unsuccessful run portion 828; however, it will be understood by a person having ordinary skill in the art that in some examples centralized BOA benefit/software automation runs chart 850 may include an unsuccessful run portion 828 in run volume indicators 856 (e.g., where BOA runs have failed).

A RPA-Hybrid process and bot counts graph 875 can include a chart (e.g., ring graph, etc.) reflecting a proportion and volume of deployed software automation types. Here, RPA-Hybrid process and bot counts graph 875 includes a bots portion 878 (e.g., indicating 77 bots) and a processes portion 876 (e.g., indicating 60 processes). RPA-Hybrid process and bot counts graph 875 provides an effective and fast view of the relative proportions of deployed software automation types.

Figure 8E:
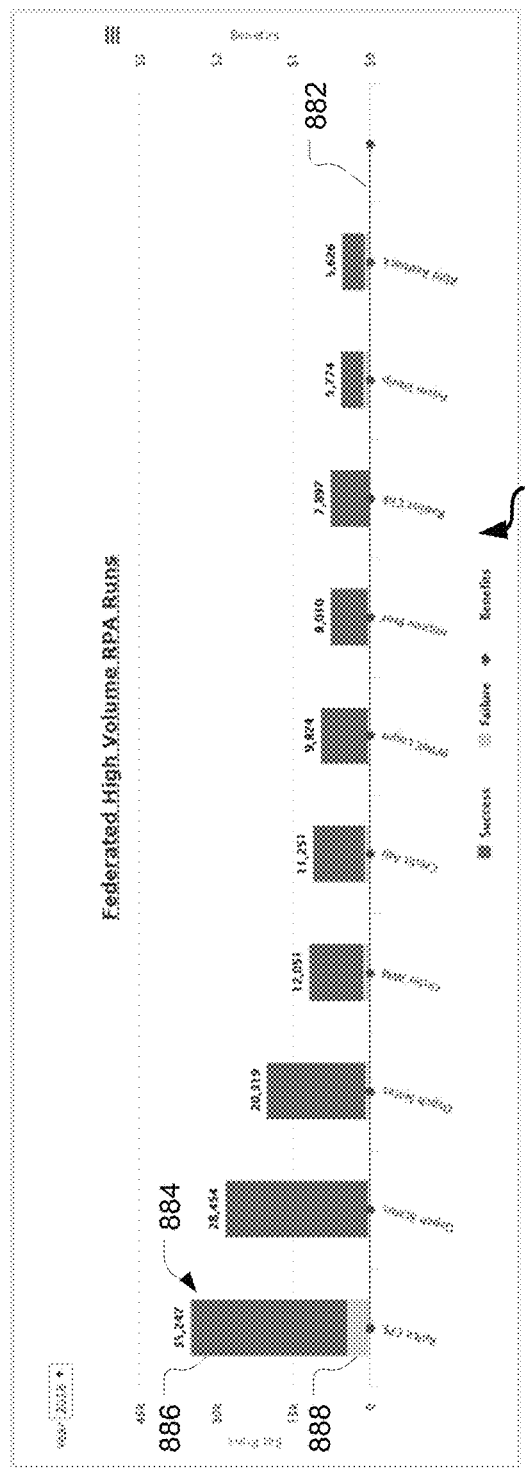

A shown in FIG. 8E, a federated high volume RPA benefit/software automation runs chart 880 includes benefit plot 882 and run volume indicators 884 made up of respective successful run portions 886 and unsuccessful run portions 888. In particular, federated high volume RPA benefit/software automation runs chart 880 provides an at a glance view of monetary benefit value and software automation usage quantities for software automations undergoing a high rate of execution (e.g., 5,000 or more runs, etc.).

Figure 8F:
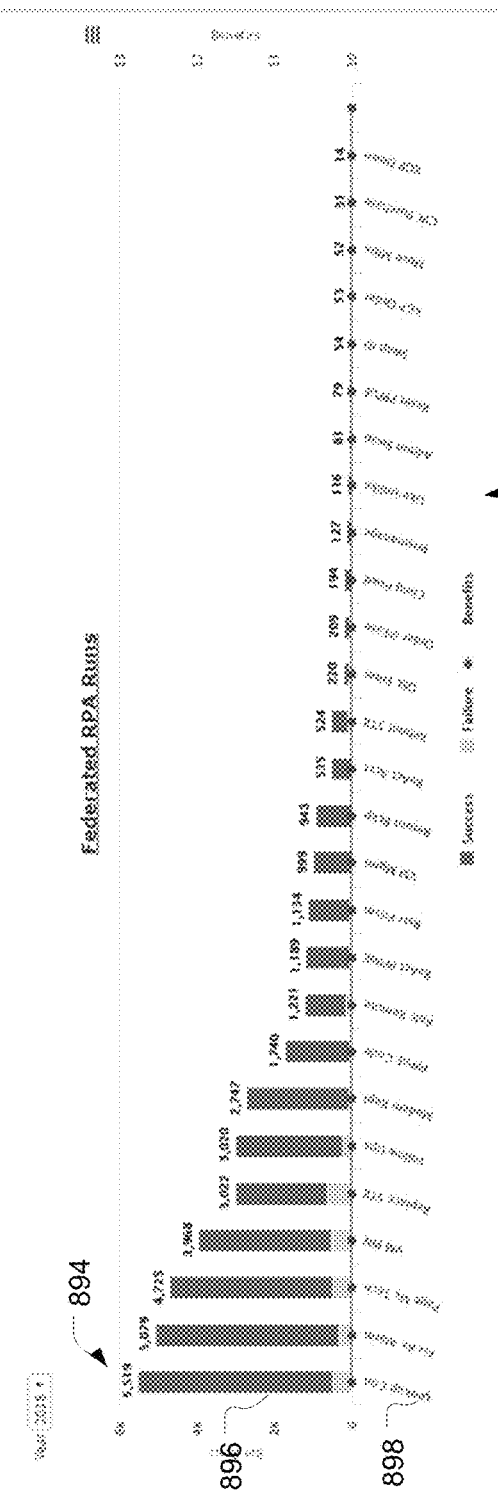

Likewise, a federated RPA benefit/software automation runs chart 890 as shown in FIG. 8F includes run volume indicators 894 made up of respective successful run portions 896 and unsuccessful run portions 898. Federated RPA benefit/software automation runs chart 890 may provide an at a glance view of all federated RPA software automations rather than just those of a certain run volume or more.

Figure 9:
FIG. 9 is an example interface for reviewing aggregated project management health information for software automation project pipelines, in accordance with the subject technology.

FIG. 9 depicts a stagegate summary view 900 which may provide an at a glance review of various steps within a pipeline (e.g., intake, review steps, development, deployment, maintenance, etc.). Stagegate summary view 900 may include a centralized chart 902, a federated chart 912, and a quickhits chart 922, each chart reflecting a particular project type (e.g., centralized, federated, or quickhits projects, etc.). Each chart may be of various graph types such as, for example and without imputing limitation, a horizontal bar graph. Centralized chart 902, federated chart 912, and quickhits chart 922 may each include a respective stage categories list 905, which includes categories reflecting particular steps within the pipeline. Each category of stage categories list 905 may include a volume indicator 904 reflecting a respective quantity of projects within the pipeline at a particular step (e.g., within a particular category). In effect, Stagegate summary view 900 provides an at a glance depiction of workloads across the pipeline at various stages and according to various project types.

FIGS. 10A-D depict asset and license management interfaces through which a user can manage various licenses and assets within a pipeline. Assets can include hardware (e.g., for hosting, compute, storage, etc.), virtual machines (VMs), or other components for developing, deploying, and/or maintaining software automations. Likewise, licenses may include licensed software or resources for developing, deploying, and/or maintaining software automations. In some examples, a license may include an ability to extend certain rights to a licensee customer (e.g., remote compute or automation service platforms, etc.). Nonetheless the extended license may be applied to or migrated between deployed software automations in order to, for example, maximize usage of the licensed service or platform.

Figure 10A:
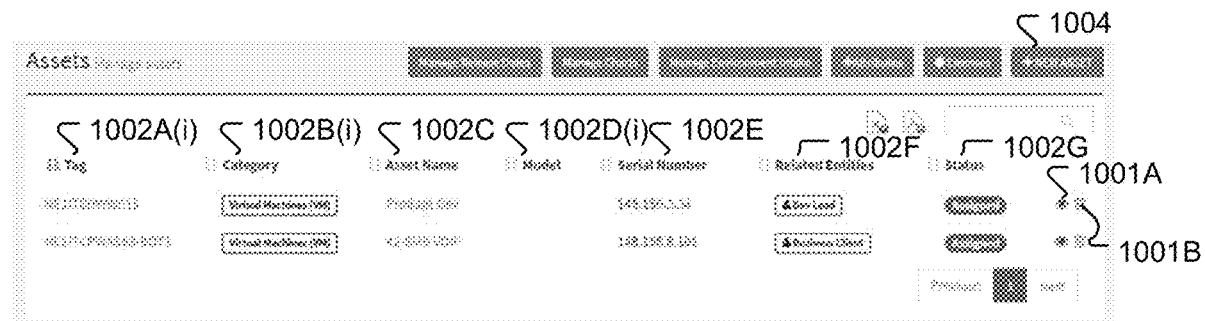

FIG. 10A depicts an assets management interface 1000 for reviewing and managing assets across the pipeline. Assets managed through assets management interface 1000 may be organized as rows assigned to particular assets with the rows including columns of asset attributes. Each row includes respective fields for asset attributes such as an asset tag 1002A(i) and an asset category 1002B(i), which identify and contextualize the particular asset manager in the respective row. Additionally, asset name 1002C, asset model 1002D(i), asset serial number 1002E, asset related entities listing 1002F, and an asset status indicator 1002G are each included in the row entry. Each row also includes a detailed viewer 1001A, for navigating to a deeper view of a respective asset, and a delete option 1001B, for quickly deleting an asset.

Figure 10B:
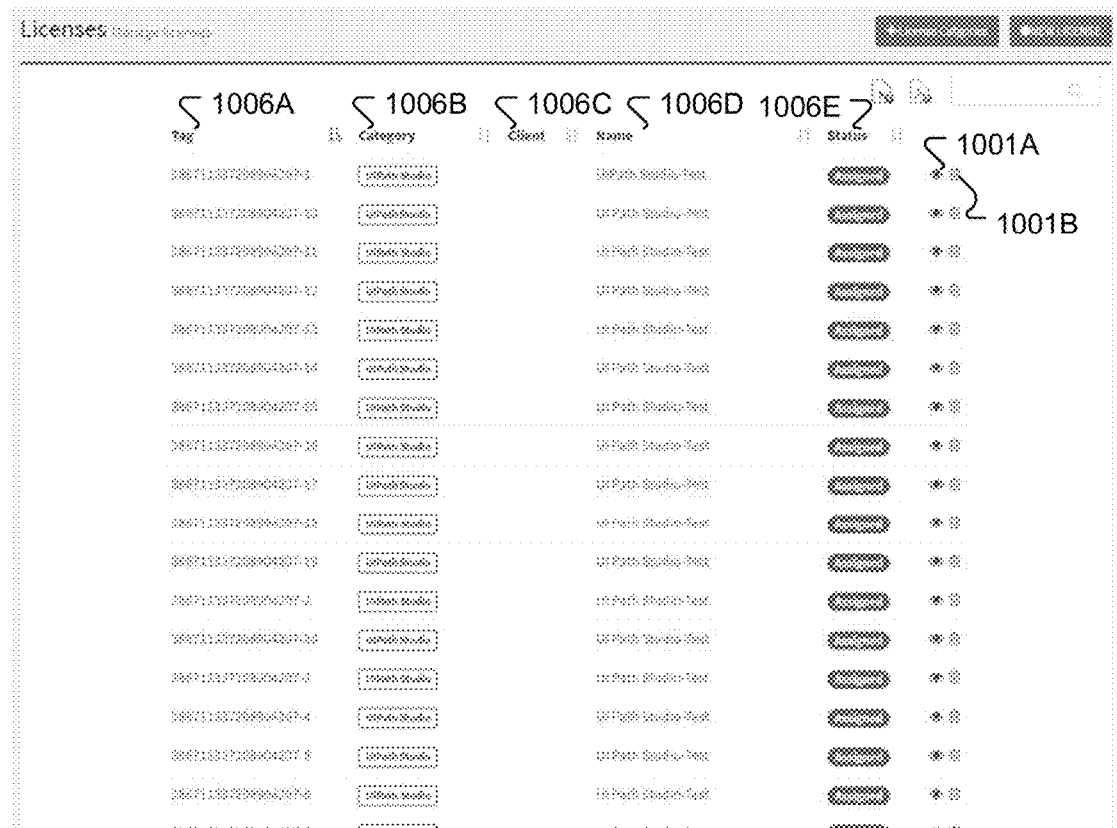

FIG. 10B depicts a license management interface 1005 for reviewing and managing licenses across the pipeline. For example, hosting and/or resource providers may provide a limited number of licenses to a user, which may then be utilized to develop and/or deploy software automations for downstream clients. Licenses managed through license management interface 1005 may be organized as rows assigned to particular licenses with the rows including columns of license attributes. Each row includes respective fields for license attributes such as a license tag 1006A, a license category 1006B, a license client 1006C, a license name 1006D, and a license status indicator 1006E. Rows additionally may include detailed viewer 1001A and delete option 1001B.

Figures 10C, 10D:
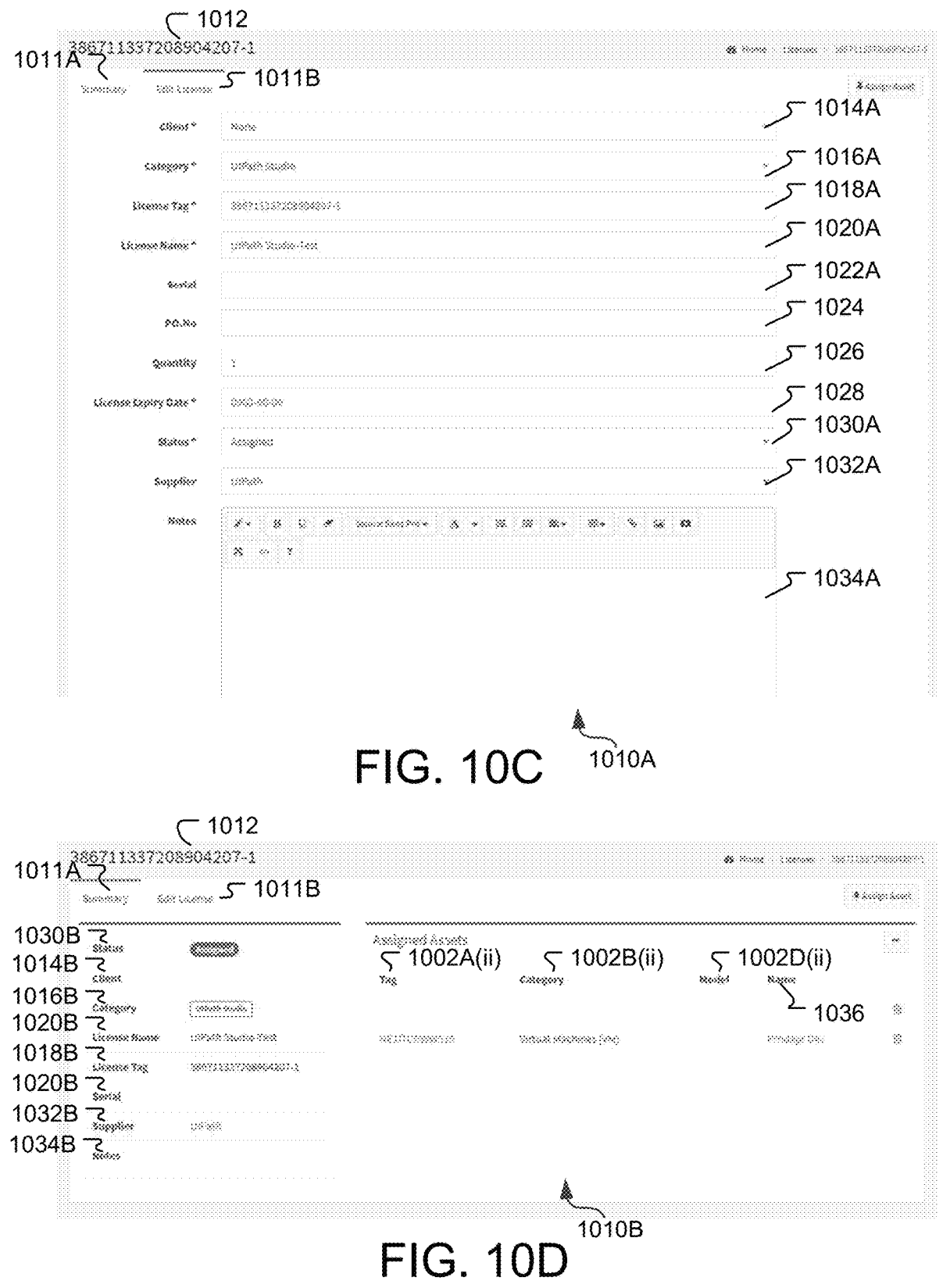

FIG. 10C depicts a detailed license edit view 1010A for reviewing and editing details of a license listed in license management interface 1005. Detailed license edit view 1010A can be accessed via detailed viewer 1001A and includes navigation tabs 1011A-B for switching between detailed license edit view 1010A and a detailed license summary view 1010B (discussed below in reference to FIG. 10D). Additionally, a tag header 1012 includes respective license tag 1006A for the accessed license.

Within detailed license edit view 1010A, a user may modify a client field 1014A, a category 1016A, a license tag 1018A, a license name 1020A, a status 1030A, and a supplier 1032A via respective dropdown tabs. The user may directly edit (e.g., via typing a new value into the respective field) serial number 1022A, PO. No 1024, quantity 1026, and license expiration date 1028. Further information may be provided via a notes section 1034A.

FIG. 10D depicts detailed license summary view 1010B, which may be accessed via navigation tab 1011A. Detailed license summary view 1010B provides a summarized view of a respective license attributes and assigned assets. Status attribute 1030B, client identifier 1014B, category attribute 1016B, license name 1020B, license tag 1018B, serial number 1020B, supplier 1032B, and notes 1034B may all be reviewed in detailed license summary view 1010B. Assets assigned to the respective license may also be viewed in a summarized format including asset tag 1002A(ii), category 1002B(ii), model 1002D(ii), and name 1036.

FIGS. 11A-E depict various management interface views for managing a pipeline engagement model listing, project type and stage categories, activity types, sub activity types, and pipeline participant roles. The management interface views allow a user to customize a pipeline to one or more different use cases through unique roles, activities, and engagement models.

Figure 11A:
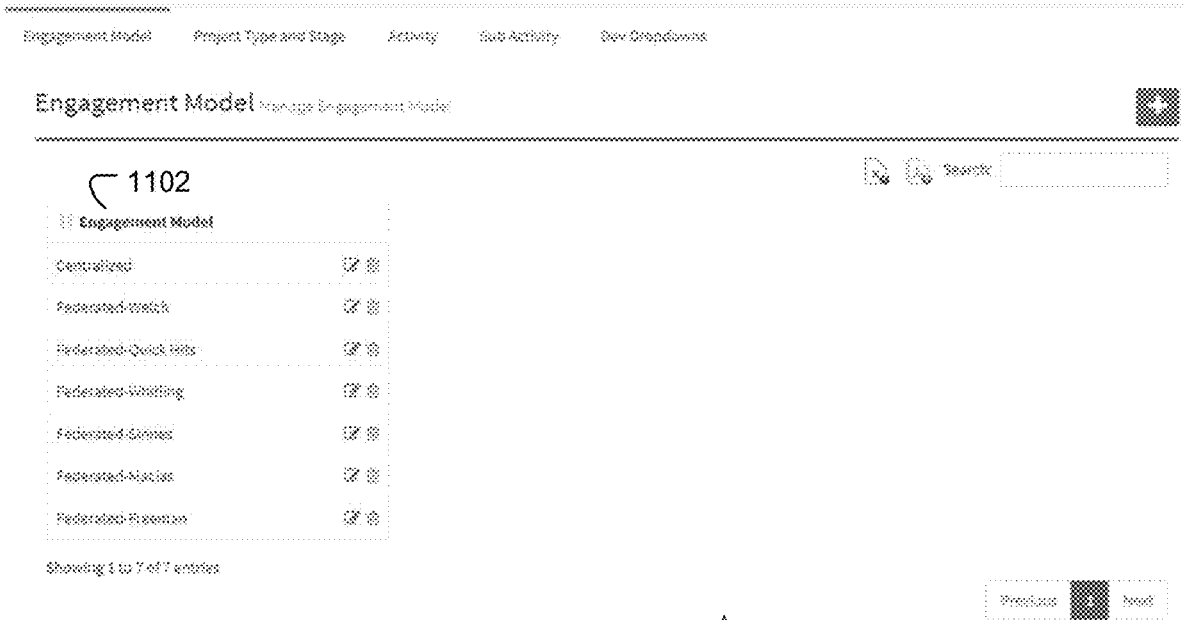
Figure 11B:
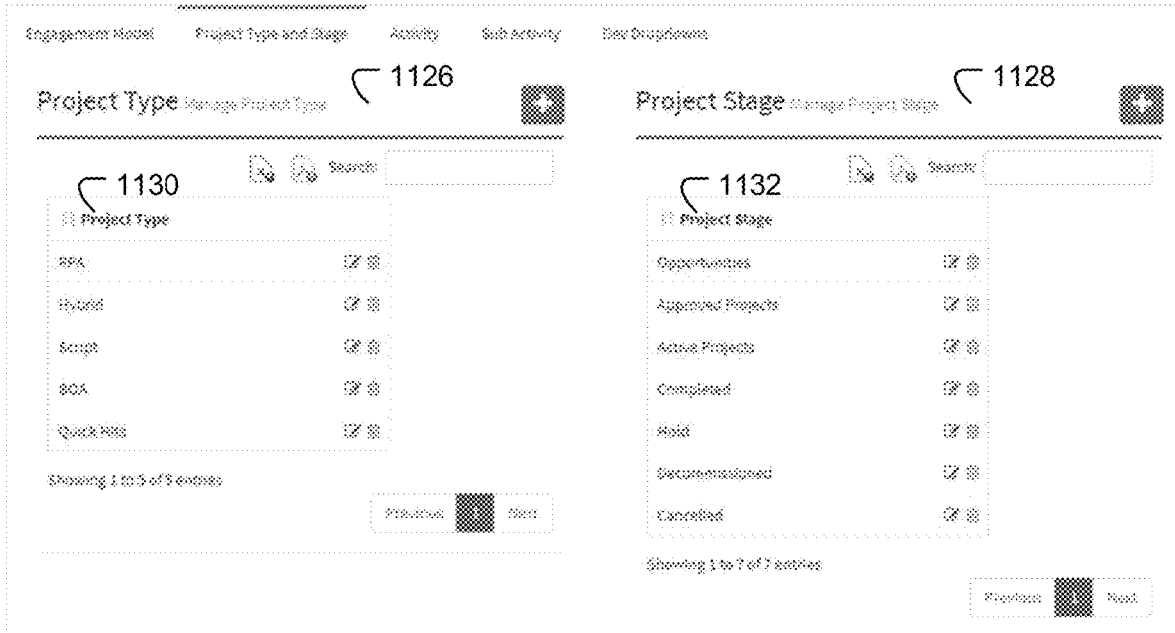

FIG. 11A depicts an engagement model management interface 1100 for specifying and modifying engagement models. An engagement model list 1102 displays an editable list of engagement models that are currently available. FIG. 11B depicts a project type and stage management interface 1125 for managing project types and project stages. Project types may describe a particular type of software automation (e.g., RPA, hybrid, script, BOA, quick hits, etc.) which can be produced by the pipeline. Project stages may describe particular steps within the pipeline through which projects may pass (e.g., opportunities, approved projects, active projects, completed, hold, decommissioned, cancelled, etc.) during development of a software automation. In particular, a project type menu 1126 includes an editable project type list 1130 including available project types and ability for users to edit project type labels. A project stage menu 1128 likewise includes an editable project stage list 1132 including available project stages and ability for users to edit project stages.

FIG. 11C depicts an activity management interface 1140 for managing activity types. Activity manage interface 1140 includes an editable list of activities in row format. Each row may include a project stage 1142 (e.g., opportunities, approved projects, active projects) including a respective activity 1144 (e.g., intake submission, intake approval, intake assessment, process/financial assessment, process documentation creation/review, infrastructure/environment set up, solution creation/review, resource assignment/backlog, development, implementation, etc.) and a sequence 1146, which indicates an approximate step within the pipeline when the respective activity is to be performed.

FIG. 11D depicts a sub activity management interface 1150 for managing sub activities. Sub activities may include pipeline steps associated with a particular activity, such as activity 1144 (discussed above). For example, an intake submission activity may include as a sub activity submitting project intake according to a particular engagement model, or a process/financial assessment activity may include assigning a process analyst and/or performing a financial assessment as sub activities.

In particular, sub activity management interface 1150 includes an editable list of sub activities in row format. Each row is associated with a particular sub activity and includes information for a respectively associated engagement model 1152, project type 1154, activity type 1156, sub activity name 1158, and role 1160, which may indicate which entity (e.g., developer, analyst, etc.) is responsible for completing the respective sub activity.

Figure 11E:
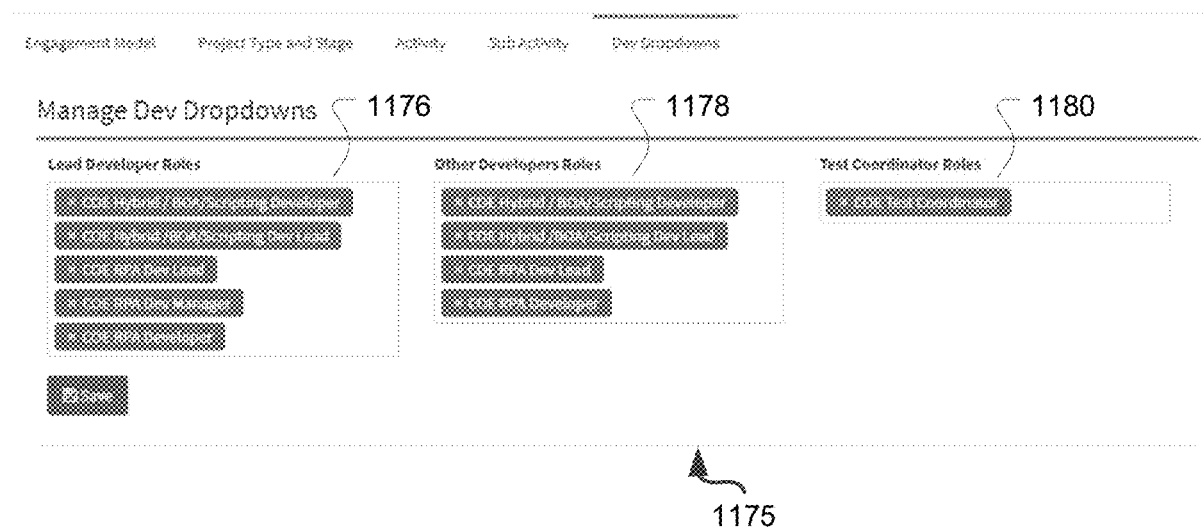

FIG. 11E depicts a pipeline participant role management interface 1175 for customizing roles (e.g., for associating with a sub activity 1158, etc.). Roles may include responsible parties at development stages along the pipeline. Pipeline participant role management interface 1175 includes an editable lead developer role listing 1176, other developer role listing 1178, and test coordinator role listing 1180. In particular, development roles may be associated with particular software automation types such as, for example, COE RPA dev lead, COE RPA developer, COE hybrid/BOA/scripting developer, etc.

FIGS. 12A-E depict various interfaces for managing groups and other participants to a software automation pipeline. For example, operational, or business, unit information, functions within the pipeline, groups related to the pipeline, specific applications, and employee types can be managed via the interfaces depicted in FIGS. 12A-E.

Figure 12A:

FIG. 12A depicts a business unit management interface 1200 for reviewing and managing business units of the pipeline. Business unit management interface 1200 may be accessed via a business unit tab 1201A. Additional tabs, including a functional area tab 1201B, workgroup tab 1201C, application tab 1201D, and professionals tab 1201E, enable a user to navigate to other management interfaces (discussed below). Business unit management interface 1200 includes an editable list of business units 1202 in row format, such as service delivery, service assurance, operations planning and strategy, field operations, local network implementation, advanced services, network planning and access management, digital and small business, and service assurance. Further, some business units may be tailored to particular engagement models. For example, a service assurance-welch business unit may be tailored to a federated-Welch engagement model while a service assurance-freeman business unit may be tailored to a federated-Freeman engagement model and thus each may be associated with distinct respective rows.

Each row corresponds to a particular business unit 1202 and may additionally include a related engagement model 1204, vice president (e.g., VP) identifier 1206, and senior vice president (e.g., SVP) 1208.

Figure 12B:
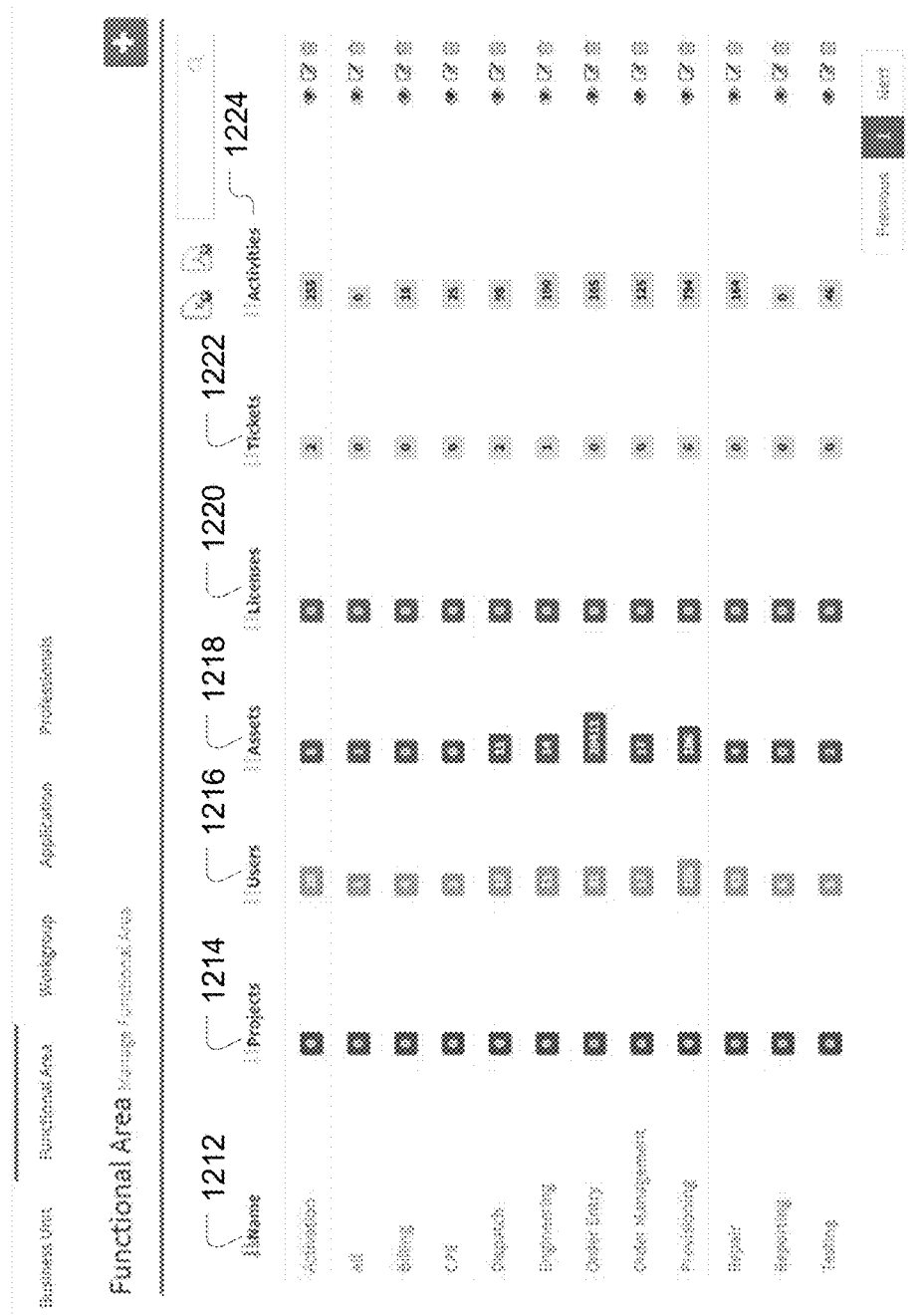

FIG. 12B depicts a functional area management interface 1210. A functional area indicates a particular operational group within the pipeline and which may be associated with various activities and/or sub activities. Functional area management interface 1210 includes an editable list of functional groups, or areas, in row format. Each row corresponds to a listed functional area name 1212 and includes information (e.g., a count) related to projects 1214 related to the functional area, users 1216 operating within the functional area, assets 1218 devoted to the functional area, licenses 1220 related to the functional area, tickets (e.g., user inquiries or tasks) 1222 for the functional area, and activities 1224 related to the functional area.

Figure 12C:
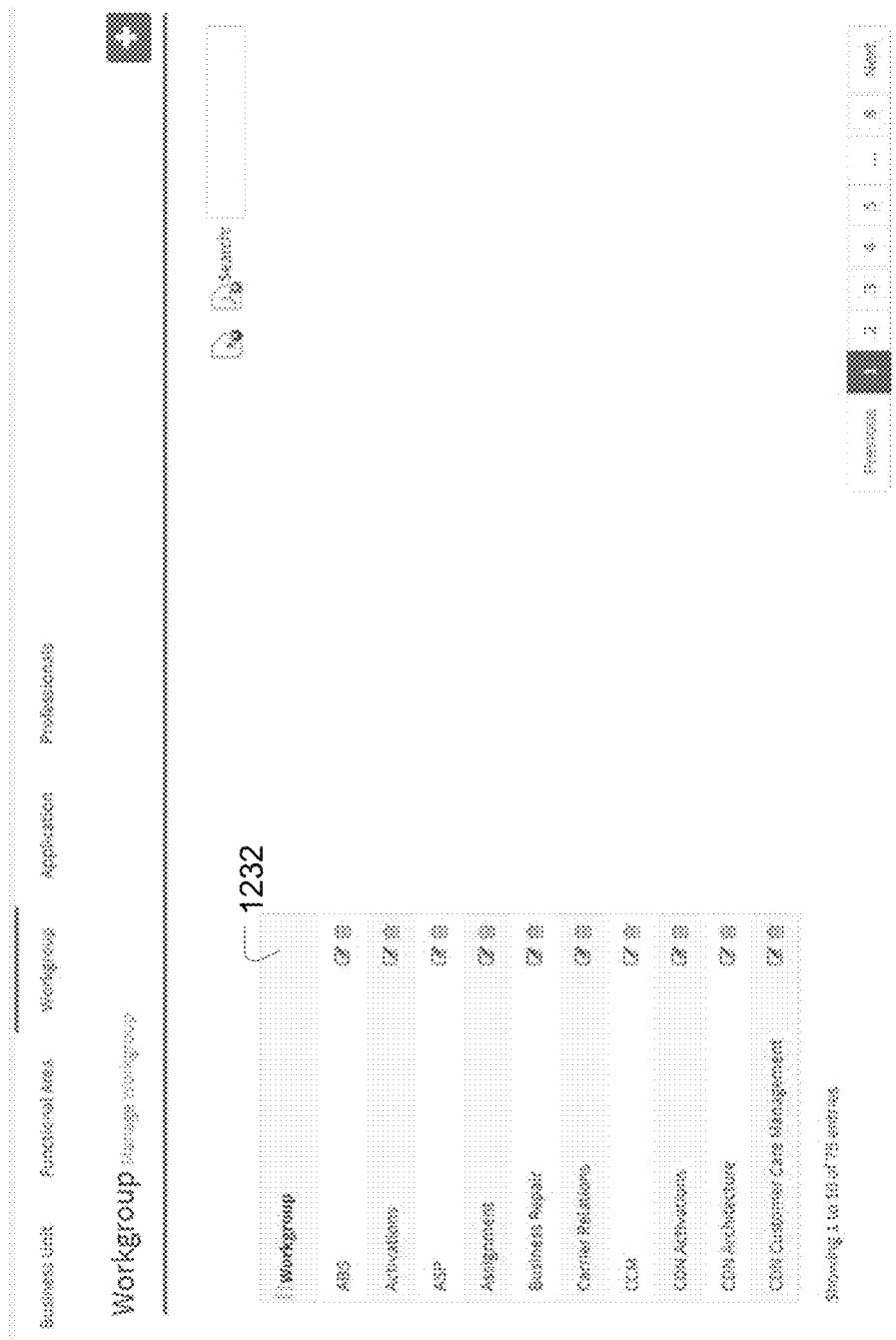

FIG. 12C depicts a workgroup management interface 1230 for managing teams and the like operating within the pipeline. Workgroup management interface 1230 includes an editable workgroup list 1232, which includes a list of workgroups (e.g., ABS, activations, ASP, assignment, business repair, carrier relations, CCM, CDN activations, CDN architecture, CDN customer care management, etc.) that me be modified or removed.

Figure 12D:
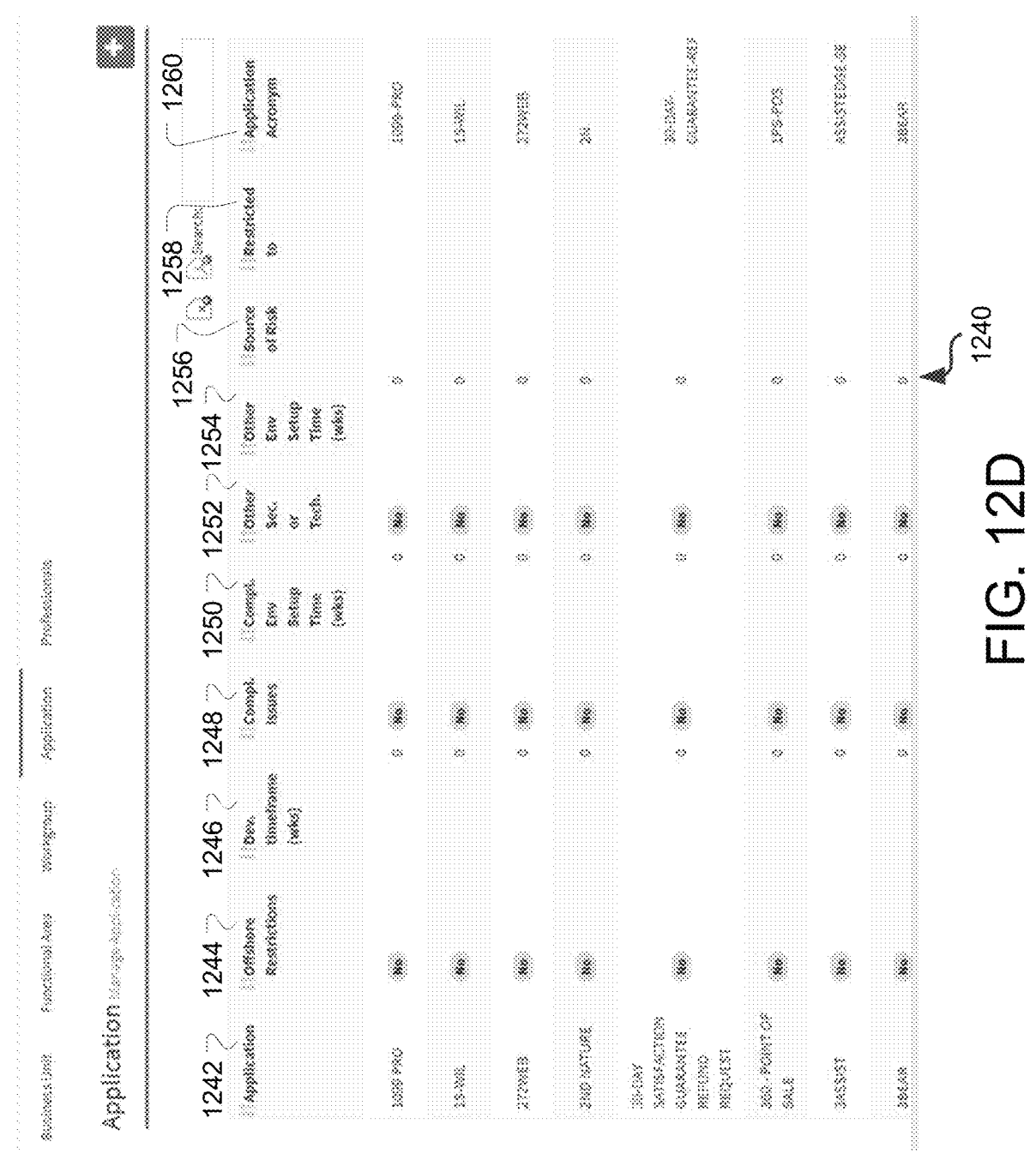

FIG. 12D depicts an application management interface 1240 for reviewing and managing particular applications 1242 related to participants of the pipeline. Application management interface 1240 includes a listing of applications 1242 in row format. Each row includes a name for respective application 1242 along with information for offshore restrictions 1244, development timeframe 1246, completed issue count 1248, completion time 1250 for a respective environment setup, security or technology issues flag 1252, other environment setup timeframes 1254, risk source identifier 1256, restrictions listing 1258, and an acronym 1260 for the respective application.

Figure 12E:

FIG. 12E depicts a professional's management interface 1270 for managing pipeline participant categories. For example, vendor information, developer information (e.g., such as respective vendor, rate, location, etc.), and location information may be managed through management interface 1270. A location list 1272 includes an editable list of locations which may be associated with participants (e.g., for remote workers, etc.). A vendor list 1274 includes an editable list of vendors which may be associated with participants. A developer list 1276 includes a list of information related to developer information for particular vendors (e.g., according to vendor list 1274) and particular locations (e.g., according to location list 1272).

FIG. 13A depicts a user data summary interface 1300 for reviewing and managing users of software automations deployed via the pipeline. User data summary interface 1300 may include a role count 1302, indicating how many roles (e.g., analyst, lead developer, etc.) are included in various projects, as well as a mech identification 1304 and user count 1306. User data summary interface 1300 further includes a listing of user names 1308 in row format. Each row includes user name 1308 as well as information related to a respective business unit 1310, user role 1312, and user email 1314.

FIG. 13B depicts an add user interface 1350 for adding additional users to the pipeline (e.g., as listed in user data summary interface 1300 discussed above). Add user interface 1350 includes an approver toggle 1352, for setting a new user as an approver, and a subject matter expert toggle 1354, for setting the new user as a subject matter expert. A name field 1356 enables entry of the new user's name, an email address field 1358 enables entry of an email address, a CUID field 1360 enables entry of a CUID for the new user, a mobile number field 1362 enables entry of a mobile phone number for the new user, a business unit dropdown 1366 enables assignment of the new user to a selected business unit (e.g., based on the interfaces discussed above), a functional area dropdown 1368 enables assignment of the new user to a selected functional area (e.g., based on the interfaces discussed above), a job title field 1370 enables entry of a job title for the new user, a role dropdown 1372 enables assignment of the new user to a selected role, and a personnel number field 1374 enables entry of a personnel identification number for the new user. Additionally, the new user may be emailed notification of their addition to the pipeline based on whether an email toggle 1364 is checked.

Figure 14:
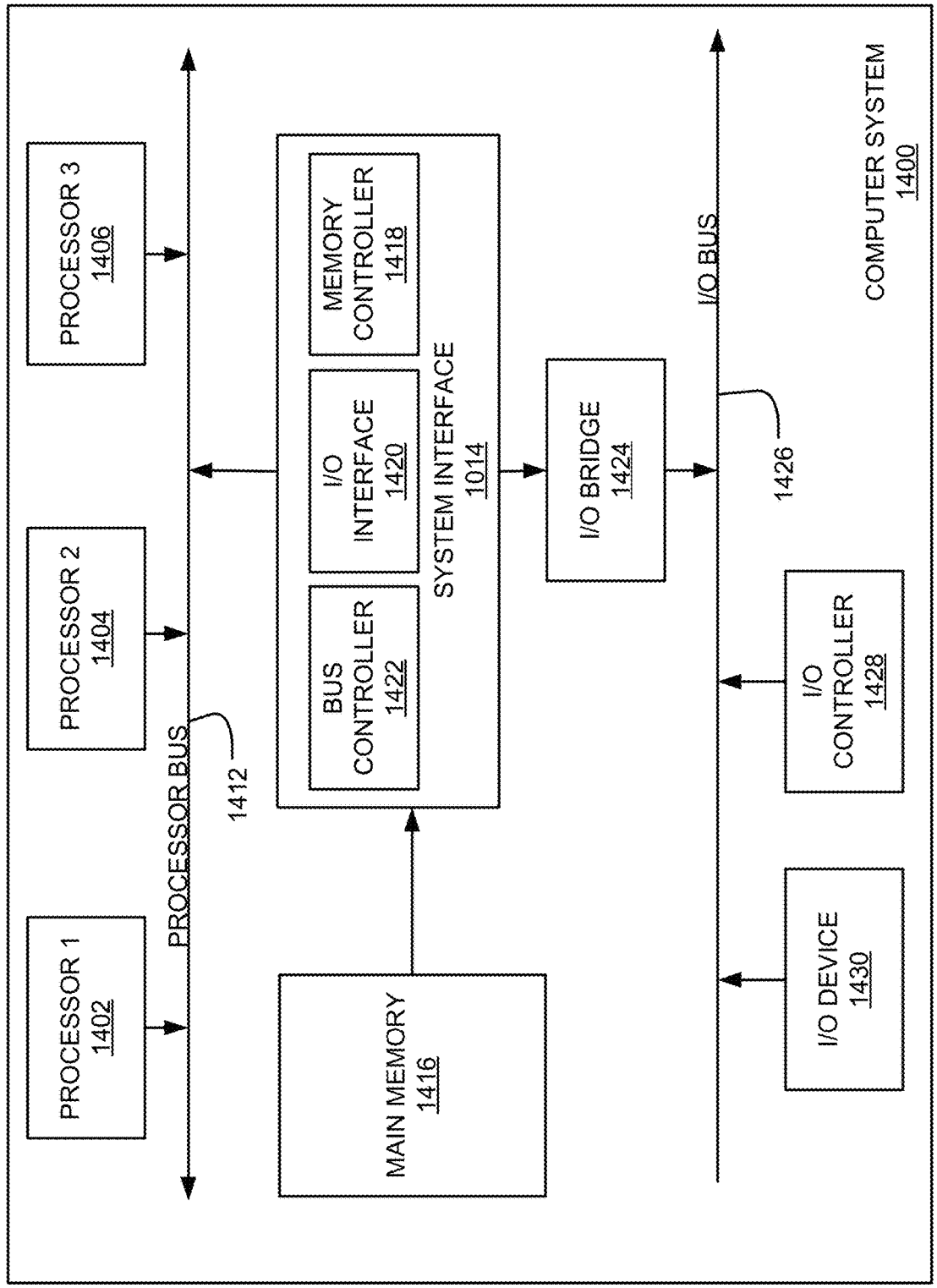
FIG. 14 is a diagram illustrating an example of a computing system which may be used in implementing embodiments of the present disclosure.

FIG. 14 is a block diagram illustrating an example of a computing device or computer system 1400 which may be used in implementing the embodiments of the systems disclosed above. The computer system (system 1400) includes one or more processors 1402-1406. Processors 1402-1406 may include one or more internal levels of cache (not shown) and a bus controller or bus interface unit to direct interaction with the processor bus 1412. Processor bus 1412, also known as the host bus or the front side bus, may be used to couple the processors 1402-1406 with the system interface 1414. System interface 1414 may be connected to the processor bus 1412 to interface other components of the system 1400 with the processor bus 1412. For example, system interface 1414 may include a memory controller 1418 for interfacing a main memory 1416 with the processor bus 1412. The main memory 1416 typically includes one or more memory cards and a control circuit (not shown). System interface 1414 may also include an input/output (I/O) interface 1420 to interface one or more I/O bridges or I/O devices with the processor bus 1412. One or more I/O controllers and/or I/O devices may be connected with the I/O bus 1426, such as I/O controller 1428 and I/O device 1430, as illustrated. The system interface 1414 may further include a bus controller 1422 to interact with processor bus 1412 and/or I/O bus 1426.

I/O device 1430 may also include an input device (not shown), such as an alphanumeric input device, including alphanumeric and other keys for communicating information and/or command selections to the processors 1402-1406. Another type of user input device includes cursor control, such as a mouse, a trackball, or cursor direction keys for communicating direction information and command selections to the processors 1402-1406 and for controlling cursor movement on the display device.

System 1400 may include a dynamic storage device, referred to as main memory 1416, or a random access memory (RAM) or other computer-readable devices coupled to the processor bus 1412 for storing information and instructions to be executed by the processors 1402-1406. Main memory 1416 also may be used for storing temporary variables or other intermediate information during execution of instructions by the processors 1402-1406. System 1400 may include a read only memory (ROM) and/or other static storage device coupled to the processor bus 1412 for storing static information and instructions for the processors 1402-1406. The system set forth in FIG. 14 is but one possible example of a computer system that may employ or be configured in accordance with aspects of the present disclosure.

According to one embodiment, the above techniques may be performed by computer system 1400 in response to processor 1404 executing one or more sequences of one or more instructions contained in main memory 1416. These instructions may be read into main memory 1416 from another machine-readable medium, such as a storage device. Execution of the sequences of instructions contained in main memory 1416 may cause processors 1402-1406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for managing a software automation, the system comprising:
   one or more processors; and
   a memory storing instructions that, when executed by the one or more processors, cause the one or more processors to:
   receive, via a portal displayed on a display device, software automation project information comprising a description of a software automation project and deliverable conditions for completing the software automation project;
   calculate, based on the software automation information, a cost benefit associated with deployment of the software automation project;
   generate, based on the calculated cost benefit, a work order for deploying the software automation, the software automation to perform an automated task on a computing device;
   store, on an application server, the software automation for execution by the application server; and
   transmit, in response to the software automation project information, a project approval communication to at least one party associated with the software automation project, the project approval communication comprising the calculated man-hour cost benefit associated with deployment of the software automation project.

2. The system of claim 1, wherein the instructions further cause the one or more processors to:
   communicate with the application server to track performance of a plurality of executions of the software automation over a period of time, the tracked performance comprising completed executions and failed executions of the software automation.

3. The system of claim 2, wherein the instructions further cause the one or more processors to:

calculate realized benefits of the completed executions of the software automation over the period of time, the realized benefits comprising manual labor costs avoided by utilization of the completed executions of the software automation.

4. The system of claim 3, wherein the instructions further cause the one or more processors to:
generate a report of the realized benefits of the completed executions of the software automation, the report comprising data visualizations, via the portal, of the realized benefits.

5. The system of claim 4, wherein the data visualizations of the report further comprises a visualization of the completed executions and the failed executions of the software automation overlayed with the calculated realized benefits.

6. The system of claim 1, wherein the at least one party associated with the software automation project comprises a participant of a task to be performed for completing the software automation project, the associated software automation project participant corresponding to one of a role, a functional area, or a business unit.

7. The system of claim 6, wherein the role, the functional area, or the business unit corresponding to the associated software automation project participant is based on an input, received via the portal, associating the software automation project participant with the role, the functional area, or the business unit.

8. The system of claim 1, wherein the instructions further cause the one or more processors to:
associate, based on the software automation project information, a license identifier with the work order for deploying the software automation, the license identifier corresponding to a system license for developing the software automation.

9. A method for managing a software automation project, the method comprising:
receiving, via a portal executed by a computing device, software automation project information comprising a description of a software automation project and deliverable conditions for completing the software automation project;
calculating, by the computing device and based on the software automation information, a man-hour cost benefit associated with deployment of the software automation project;
generating, based on the man-hour cost benefit exceeding a benefit threshold value, a work order for deploying the software automation, the software automation to perform an automated task on a computing device;
storing, on an application server, the software automation for execution by the application server; and
transmit, in response to the software automation project information, a project approval communication to at least one party associated with the software automation project, the project approval communication comprising the calculated man-hour cost benefit associated with deployment of the software automation project.

10. The method of claim 9 further comprising:
tracking performance of a plurality of executions of the software automation over a period of time, the tracked performance comprising completed executions and failed executions of the software automation.

11. The method of claim 10 further comprising:
calculating realized benefits of the completed executions of the software automation over the period of time, the realized benefits comprising manual labor costs avoided by utilization of the completed executions of the software automation.

12. The method of claim 11 further comprising:
displaying a report of the realized benefits of the completed executions of the software automation, the report comprising data visualizations, via the portal, of the realized benefits.

13. The method of claim 9, wherein the at least one party associated with the software automation project comprises a participant of a task to be performed for completing the software automation project, the associated software automation project participant corresponding to one of a role, a functional area, or a business unit.

14. The method of claim 13 further comprising:
receiving, via the portal, an input associating the software automation project participant with the role, the functional area, or the business unit the role corresponding to the associated software automation project participant.

15. Code implemented in a non-transitory, computer readable medium that when executed by at least one processor, is operable to perform at least the following:
receiving, via a portal executed by a computing device, software automation project information comprising a description of a software automation project and deliverable conditions for completing the software automation project;
calculating, by the computing device and based on the software automation information, an estimated cost benefit associated with deployment of the software automation project;
generating, based on the estimated cost benefit exceeding a benefit threshold value, a work order for deploying the software automation, the software automation to perform an automated task on a computing device;
storing, on an application server, the software automation for execution by the application server; and
transmit, in response to the software automation project information, a project approval communication to at least one party associated with the software automation project, the project approval communication comprising the calculated man-hour cost benefit associated with deployment of the software automation project.

16. The code of claim 15 further operable to perform:
tracking performance of a plurality of executions of the software automation over a period of time, the tracked performance comprising completed executions and failed executions of the software automation.

17. The code of claim 16, further operable to perform:
calculating realized benefits of the completed executions of the software automation over the period of time, the realized benefits comprising manual labor costs avoided by utilization of the completed executions of the software automation.

18. The code of claim 17, further operable to perform:
displaying a report of the realized benefits of the completed executions of the software automation, the report comprising data visualizations, via the portal, of the realized benefits.

* * * * *